US011656157B2

(12) United States Patent
Wu et al.

(10) Patent No.: US 11,656,157 B2
(45) Date of Patent: May 23, 2023

(54) POWERED SAMPLING DEVICE

(71) Applicant: Fremonta Corporation, Fremont, CA (US)

(72) Inventors: Florence Wu, Milpitas, CA (US); Wei Wu, Milpitas, CA (US); Yongqing Huang, Newark, CA (US); Eric Wilhelmsen, Milpitas, CA (US)

(73) Assignee: Fremonta Corporation, San Jose, CA (US)

( * ) Notice: Subject to any disclaimer, the term of this patent is extended or adjusted under 35 U.S.C. 154(b) by 283 days.

(21) Appl. No.: 16/859,528

(22) Filed: Apr. 27, 2020

(65) Prior Publication Data
US 2020/0340887 A1 Oct. 29, 2020

Related U.S. Application Data

(60) Provisional application No. 62/838,635, filed on Apr. 25, 2019.

(51) Int. Cl.
*G01N 1/02* (2006.01)
*G01N 1/10* (2006.01)
*G01N 35/00* (2006.01)

(52) U.S. Cl.
CPC ......... *G01N 1/10* (2013.01); *G01N 35/00732* (2013.01); *G01N 2001/028* (2013.01); *G01N 2035/00752* (2013.01)

(58) Field of Classification Search
CPC ............... G01N 1/10; G01N 35/00732; G01N 2035/00752; G01N 2001/028; G01N 1/04
USPC ................... 73/864, 864.41, 864.71, 864.91; 600/570–572
See application file for complete search history.

(56) References Cited

U.S. PATENT DOCUMENTS 3,841,973 A * 10/1974 Wilkins et al. ........ C12M 33/02
73/864.31
4,202,067 A * 5/1980 Stamatovic ............ A46B 13/02
15/28

(Continued)

FOREIGN PATENT DOCUMENTS

WO 2018053191 * 3/2018
WO 2019060264 * 3/2019

OTHER PUBLICATIONS

International Search Report in PCT/US2020/030123, dated Sep. 4, 2020, 4 pages.

*Primary Examiner* — Robert R Raevis
(74) *Attorney, Agent, or Firm* — Kilpatrick Townsend & Stockton LLP

(57) ABSTRACT

Powered sampling systems, devices and methods of surface sampling are provided herein. A portable handheld sampling device can include an actuator operably coupled with a sampling head supporting a sample medium. One or more sensor indicate when a suitable force or pressure is applied by the sampling device as well as the duration of sampling. The actuator can provide movement of the sampling medium, such as rotational movement. The sampling device can provide guidance to a user to facilitate standardized sampling according to a sampling protocol. The sampling device and system can include communication means to facilitate automatic sample logging and period updates of sample protocols. System for creating and managing sampling plans and test results are also provided herein.

17 Claims, 33 Drawing Sheets

(56) References Cited

U.S. PATENT DOCUMENTS

| | | | | |
|---|---|---|---|---|
| 4,848,165 A | * | 7/1989 | Bartilson | G01N 1/04 73/864.71 |
| 5,823,592 A | * | 10/1998 | Kalidindi | G01N 1/02 15/210.1 |
| 6,379,565 B1 | | 4/2002 | Guirguis et al. | |
| 2007/0137319 A1 | | 6/2007 | Nascon et al. | |
| 2009/0030341 A1 | | 1/2009 | Kshirsagar et al. | |
| 2015/0148265 A1 | * | 5/2015 | Baym | A61B 5/486 600/572 |
| 2016/0203965 A1 | | 7/2016 | Rorick et al. | |
| 2018/0164189 A1 | | 6/2018 | Bilodeau et al. | |

* cited by examiner

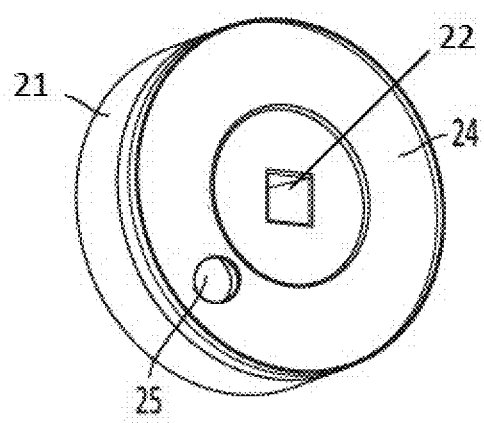
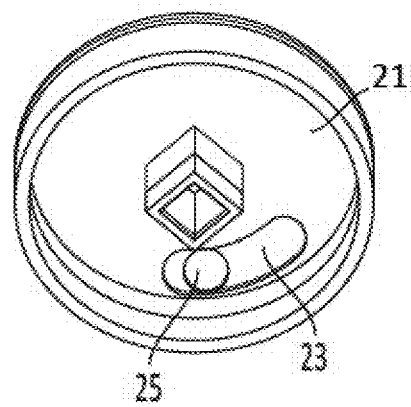
FIG. 5A        FIG. 5B
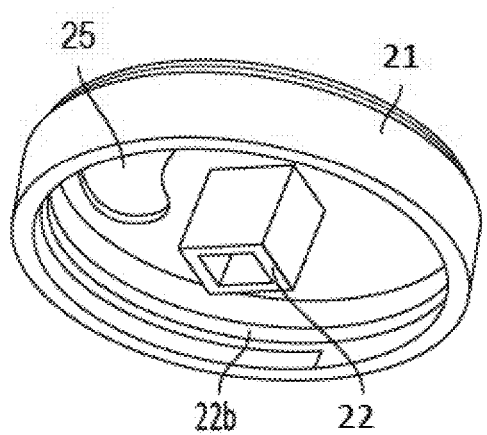
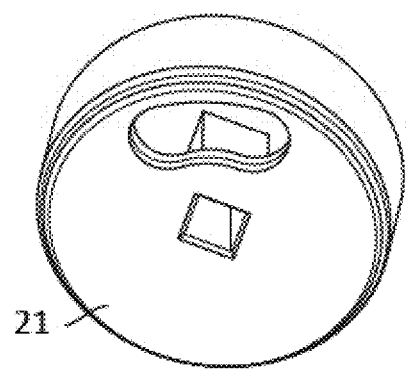
FIG. 6A        FIG. 6B
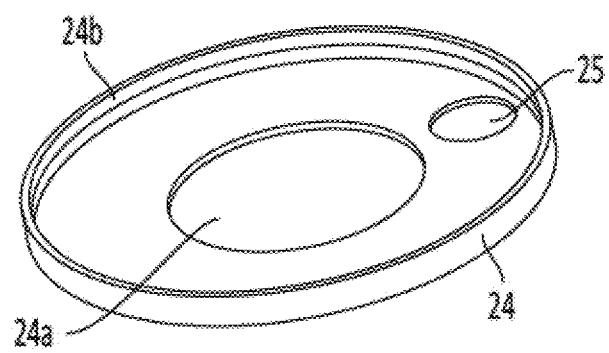
FIG. 7

POWERED SAMPLING DEVICE

CROSS-REFERENCES TO RELATED APPLICATIONS

This application is a Non-Provisional of and claims the benefit of priority of U.S. Provisional Application No. 62/838,635 filed Apr. 25, 2020, the entire contents of which are incorporated herein by reference.

This application is generally related to the following applications: PCT Application No. US2018/045699 filed Aug. 8, 2018 and U.S. Provisional Application No. 62/711,167 filed Jul. 27, 2018, the entireties of which are incorporated herein by reference for all purposes.

FIELD OF ART

The present invention pertains to system, devices and methods for sampling, in particular surface sampling.

BACKGROUND

Surfaces are sampled for many analytes including toxins, biologicals, microbial flora, other residues. Most of this sampling is done manually by passing or rubbing various swabs, fabric swatches and other absorbent materials such as sponges, cotton balls, or various paper products over the surface to be sampled.

Surface sampling can be performed to detect the presence/absence of an analyte or can be for quantitative analysis. In either case, the sensitivity and accuracy are highly dependent on the skill and expertise of the person doing the sampling. There are many subtle factors that can change the results including but not limited to: the area sampled, the amount of overlap of passes within an area, the pressure applied, and the extent to which the whole surface of the sampling device is used. Manual sampling also tends to be inconsistent among the people collecting the samples and among different sampling times. Conformance to a certain sampling protocol is always a concern.

In addition, surface sampling and most other sampling processes generally require meta data collection. At a minimum, knowledge of what was sampled, location, and time, are necessary for the results to be meaningful. Knowledge of other aspects, such as who took the sample, the lot number for the population being sampled and lot of the sampling device, and the specific sampling protocol, can also be important. The scope and types of meta data vary according to application.

Thus, there is a need for improved, more consistent sampling methods, particularly when samples are collected by multiple people. There is further need for improved collection and logging of sample data. There is further need to facilitate management and coordination of sampling as well as improved logging and verification of sampling locations.

BRIEF SUMMARY

In one aspect, the invention pertains to sampling systems devices and methods that facilitate surface sampling and improve standardization of sampling. Such systems can include the use of sampling devices having a powered actuator that, along with a sampling head, standardizes sampling conditions. These conditions can include, but are not limited to, any of: sampling pressure and area, sampling duration, and rotation of the sample medium during sampling. In some embodiments, the device wirelessly communicates (e.g. via radio waves, Bluetooth, infrared) to an internet capable device to enable automatic sample logging.

In another aspect, the sampling device obtains one or more attributes associated with sampling or a particular sample and records or communicates the one or more attributes to a management system. The one or more attributes can include any of: sampling personnel, sampling device ID, location, sample type, size or ID, duration of sampling, and time. In some embodiments, the sampling device can scan a location code and store a sample ID. For example, each location can have a QR code. Upon scanning the code with the sampling device, the sample information will be stored by the sampling device and can be associated with a sample taken at that location. This streamlines recording of meta data by the operator. In some embodiments, this information will be shown on a screen display on the sampling device, along with time of sample collection. After sampling, the location code and sampling time are stored in the sampling device, which can be downloaded onto a computer by a flash drive or can be communicated wirelessly to a computer of a management unit. It is appreciated that the screen display can be embodied within a portable handheld device, such as a smartphone, that is communicatively coupled (e.g. corded connection, wireless communication) to the sampling device.

In some embodiments, the sampling system encompasses two main parts, a powered sampling tool (e.g. actuator, driver) and a sampling head (e.g. sampler). The sampling tool is powered, driven at least partly by electricity (e.g. battery, rechargeable battery, hardwire powerline). Typically, the driven actuator includes a connector for coupling with the sampling head. In some embodiments, the sampling device is configured to provide rotational movement (e.g. clockwise or counter-clockwise) of the sampling head and can further include a speed control. In some embodiments, the sampling device is operably coupled with a processor control module that includes a memory card that can store sampling information (e.g. sampling protocol), which can be downloaded or updated periodically via various means. In some embodiments, the sampling device has a control panel and display to provide feedback to guide the user in conducting surface sampling. Typically, the sampling head includes a lid, a rod that is attached to the lid and extends distally therefrom, a sampling medium attached at or near a distal end of the rod and a sample container (e.g. tube, vial or jar). In some embodiments, the lid has an indent for receiving a component of the actuator (e.g. rotatable shaft). In some embodiments, the lid has one or more openings for injecting materials into the tube while the lid is attached to the sample container, such as additives, diluents, reagents, liquid, water, media, etc. Such openings can be protected by a slidable or rotatable member, such as an overlay lid, before and after adding materials into the tube. In some embodiments, the inner side of the lid has a rod attachment, which can be connected to the sampling medium.

The sampling medium may be of various materials, for example, cellulose, polystyrene, cloth, etc. The sampling member can be a pad and can be moistened or otherwise treated for collection purposes. In some embodiments, the sampling medium can be turned in a circular motion by the actuator of the sampling device over the sampled surfaces so as to collect residues, microorganisms, or foreign materials. The sampling medium can be used for sampling various types of surfaces, such as environmental surfaces, manufacturing machinery, product surfaces, animal carcasses surfaces, conveyor surfaces. Typically, after sampling, the sampling medium is placed inside the tube in a way to avoid contamination. The collected sampled materials may be treated and/or tested directly in the sample container (e.g. tube) or transferred for further treatment or analysis. The tube can be used as centrifuge tube, filtration device or direct reaction tube. The sampler can be used as an enrichment culture container. The entire sampler can be inserted into an instrument and automatically analyzed. It is appreciated that while surface sampling is described herein, the sampling protocols and management of sampling plans, sample collection and sample test results can also be applied to various other types of sampling as well.

Such sampling devices can be further understood by referring to the following figures and detailed descriptions.

BRIEF DESCRIPTION OF THE DRAWINGS

FIGS. 5A-7 show lid components of the sampling head that interface with the sample container so as to contain the sample medium before and after sampling, in accordance with some embodiments.

DETAILED DESCRIPTION

Figure 1:
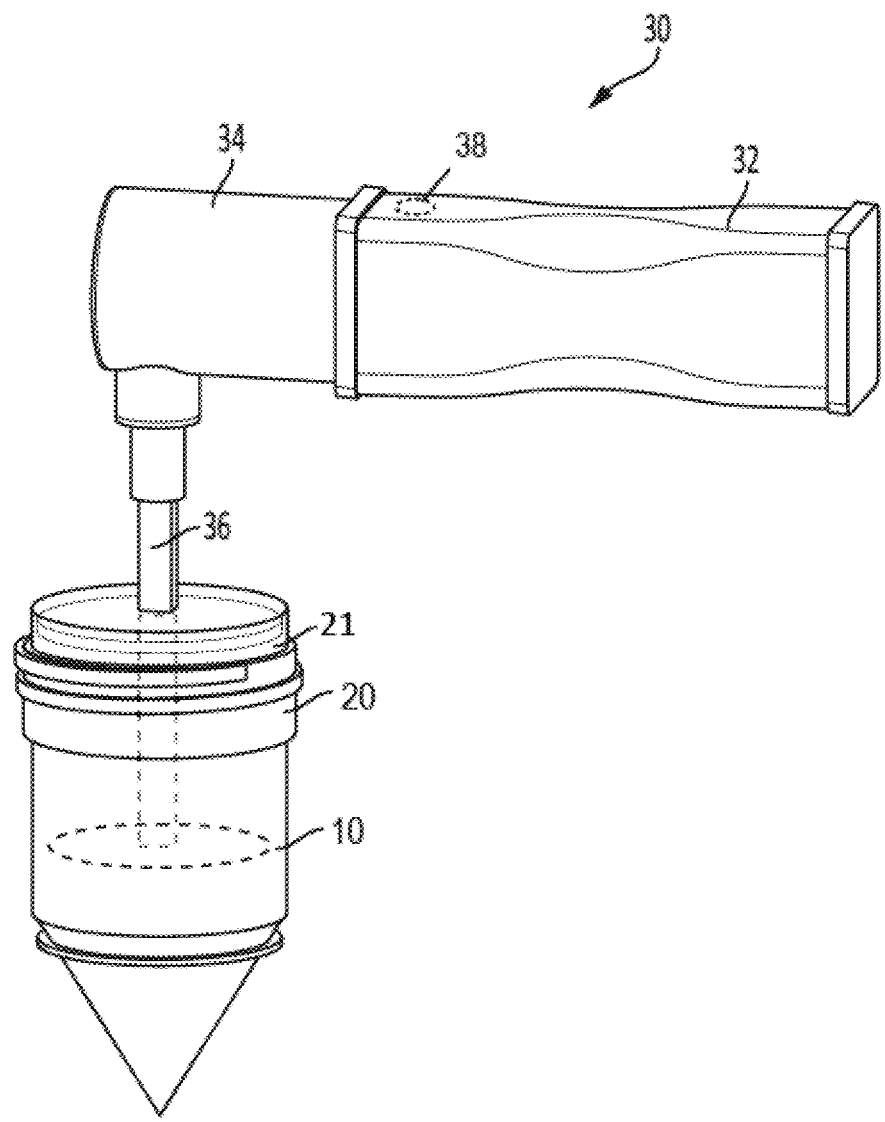
FIG. 1 shows an exemplary sampling device that includes a sampling media disposed in a sample container, in accordance with some embodiments.

The present invention pertains to a sampling system, sampling device and methods of sampling. In one aspect, the invention pertains to a portable powered sampling device that facilitates surface sampling and improves consistency of sampling, thereby allowing standardization of surface sampling. The sampling device can include any of the features described herein or any combination thereof. Given the many ways these features can be combined, various aspects will be described individually before presenting exemplary embodiments. In general, the sampling need determines the features included in a particular sampling device.

I. Standardized Sample Protocol

In some embodiments, the sampling system is configured to provide user feedback that directs or guides the operator in sampling, for example, directing the user where, how and when to sample. These aspects can encompass a systematic sampling protocol. This systematic protocol can be stored on a processing module that is housed within the sampling device, or within a base station or data system. In some embodiments, the data system may be connected to a cloud or internet-based system and communicated via a communication module of the sampling device.

In one aspect, the sampling system involves placing a sampling medium of the sampling device in contact with a surface to be sampled and applying a pressure or force to ensure sufficient contact for surface sampling. Sampling protocols can include applying a certain pressure or force. In some embodiments, the feedback and guidance includes monitoring the pressure or force applied during sampling. Too little force or too much force and the results will be less comparable to and inconsistent with other samples. Differing forces applied by differing operators when sampling presents challenges to providing consistent, reliable sampling results. Thus, in order to improve consistency and repeatability, sampling standards can be used.

Sampling force or pressure is one aspect of standardization. Other aspects include sampling time and duration. Preferably, the duration of sampling should be controlled. Typically, an overall sampling plan should require samples to be taken on a set schedule.

II. Sampling Device

In some embodiments, the sampling device is configured to include features that allow for standardization of sampling, that can include any or all of:
- A controlled circular sampling area for standardization;
- Automatically timing sampling interval; and
- A pressure sensor to use during the sampling process;

A. Sampling Media/Material

In one aspect, the sampling device includes a sampling media or material suitable for a specific sampling operation. For example, a material approved for food contact should be used for sampling food surfaces or food contact surfaces to avoid the potential for undesirable incidental additives. Most constraints of this type will be known to those skilled in the art of food safety sampling because some media is currently used to sample surfaces. However, some materials have been noted to have desirable properties and can be considered for specific applications, such materials can include but are not limited to: cellulose foams or sponges, urethane sponges or foams, absorbent papers or pads, low nap lawns of fibers, non-woven fabrics such as those made from polyolefin polymers. In some applications, the sampling material can include more abrasive and adhesive surfaces which are appropriate when portions of the surface need to be removed as opposed to just seeking materials adhering to the surface. All of the above sampling materials retain residue of the material that contacts the sampling media.

In some embodiments, the sampling material is a layered or laminated structure. When the sampling surface does not have the mechanical strength to sample the surface, it can be reinforced or supported by one or more backing structures. In some cases, the sampling material will be bound to or attached to a supporting material. This binding can be mechanical as a clip or fastener or more chemical as an adhesive or other lamination process. The sampling media can even be attached to the container as discussed below to reduce the material costs and potentially better serve some sampling needs.

For many applications, it will be desirable to have a distinctive color should any portion of the sampling media be lost during sampling. This is not a planned outcome, but such events do happen.

B. Sampling Head

In another aspect, the sampling device includes a sampling head that interfaces with and supports the sampling media. The configuration of the sampling material and the means of connecting it to the sampling head which connects the sampling material to the actuator for sampling can be adapted to various surfaces and materials. In many applications, it is useful to consider this attachment vehicle and the sampling material as a sampling head. For most applications, this sampling head will need to be sterile and suitable for collecting microorganisms if microorganisms are the sampling target. In other cases, it will be especially clean to allow for sampling particles, toxins or trace materials. The size and shape of the sampling media is normally constrained by the size of the container as discussed below. Typically, the sampling head will be removed from the container by attaching the actuator without contacting the sampling media. It is often convenient to include the closure of the container as part of the sampling head to facilitate these manipulations.

In the embodiments depicted herein, the sampling medium is shown as a circular disc. Discs of sampling media are a particularly useful shape that lends itself to use with an actuator that provides rotational motion. However, it is appreciated that the sampling media can be of any suitable size and shape (e.g. square, rectangular, oval, etc.), which can vary based on the application and type of sampling. Other shapes can be included in a sampling head and still allow the invention to perform in substantially the same or similar manner. It is desirable for ease of use to have the sampling media as attached to the sampling head to easily fit in and out of the container such that contamination does not occur in preparation for sampling or after sampling when the sullied media needs to be stowed prior to transport and analysis. In one aspect, providing multiple sampling media of a fixed size and shape (e.g. fixed diameter circular pads) allows for consistency between multiple samples, thereby improving standardization of sampling. It is appreciated that different types of sampling and testing may utilize different sizes, shapes or types of sampling media.

In some embodiments, the sampling head includes the container closure and a shaft to which the sampling media is attached. The sampling head will generally include a means of attaching the sampling head to the actuator. In some embodiments, the actuator includes a connector receptacle that interfaces with the shaft of the sampling head. In other embodiments, the actuator includes a shaft that interfaces with the sampling head. The actuator can include any suitable type of connector, connections including, but not limited to, a square or hexagonal socket into which an appropriate pin from the actuator can be inserted. It is appreciated that various other shapes would suffice, for example, a simple slot could be used. In some embodiments, a locking mechanism is used to enhance security of the fit.

In some embodiments, the sampling device includes a connector that connects the sampling head to the actuator. Typically, the connector includes a shaft or a receptacle that interfaces with a shaft of the sampling head. The connector can be any type of connection suitable for imparting force from the actuator to the sampling head. In some embodiments, the connection imparts rotational forces as well. Such connections can include, but are not limited to, any type of connection currently used for attaching sockets, drivers and other active portions of tools to various manual and powered actuators. In some embodiments, the shaft supporting the sampling media can be molded as part of the closure or can be formed separately. The length of the shaft need only be of sufficient length to allow the desired sampling to be performed. In some embodiments, the sampling media can even be directly attached to the closure obviating a piece of the sampling head and thereby reducing costs. However, eliminating the shaft may render an in-situ enrichment more complicated if a vent has been included in the closure for adding enrichment media. The process of switching sampling heads needs to be aseptic to avoid cross contamination of samples when microbial or other biological sampling is done.

A typical configuration will attach the sampling media to a shaft that is part of the sampling head which will be rotated to collect a sample. The media can be attached at any point, but a center attachment typically provides more passes over the sampled area with each rotation. A center attachment makes it easier to slide the sampling media into and out of the container which is discussed below. However, other configurations are consistent with the invention and can allow better mimicking of current sampling patterns. This is particularly true of situations where the actuator oscillates back-and-forth rather than spins. It is understood that the actuator can be configured to provide oscillation in various ways, for example, back-and-forth rotational movement, back-and-forth linear movement in one or more directions, or any combination of movements. In some embodiments, the sampling device can be selectable between differing types of sampling movements, including but not limited to any of the sampling movements described herein.

In some embodiments the sampling head is at least partially constructed of metal such that, for food processing operations, the sampling head can be detected by a metal detector for rejection should one be lost in the product stream.

C. Sample Container

In another aspect, the sampling device can include a sample container. A sample container is typically needed to protect the hygiene and cleanliness of the sampling media prior to use and to protect the sullied media after the sampling has been accomplished. Although from a cost standpoint, it is preferable to use the same container for both these functions, two containers could perform these functions. As mentioned previously, the closure can be part of the sampling head. This again reduces the amount of material needed and would therefore reduce costs. The closure can be connected to the body of the container in many ways to yield a tight seal that is sufficient to maintain the hygiene and cleanliness of the sample media. Such seals can be water tight at need. Examples of these types of connections include a threaded connection, snap on friction fit typically with a ridge relying on plasticity of the materials, twist lock or locking tabs. Other strategies can be considered but may increase costs due to the increased number of parts.

The size of the container impacts the utility of the sampling system as it must be sized to contain the sampling media. When the sampling head is attached to the containers prior to use, the container dictates the volume of storage required for each sample. After use, the container still occupies the same volume, but it also dictates the amount of enrichment or extraction media necessary to analyze the sample when the targets are not analyzed in situ on the sampling media. Some analytes are stained in place so neither extraction nor enrichment are necessary. Typical volumes are expected to be between 50 and 150 mls but special needs could prompt systems as small as a few mls and systems as large as 1500 mls, although it is appreciated any suitable size could be used. Generally, there are economic incentives to minimizing the size of the container, but the specific sampling need ultimately drives container size.

The shape, rigidity and material used for making the container is driven by a mix of cost and function. Using a container that is already an item of commerce also has advantages. Various cylindrical containers with appropriate features for attaching the closure can be envisioned. There are special advantages for some uses if the container has a conical bottom and is designed to permit centrifugation to sediment analytes, particularly bacteria and other cells. The container itself need not support the full stress of centrifugation if it can be supported as with a sleeve of some sort. There are many materials that can be appropriate including the polyolefins, polycarbonate, nylon, PET, PEEK, and other more exotic materials that will have special desirable properties such as non-adherence of cells or tolerance to solvents. The use of glass can be considered but it is heavier and more fragile than plastics. In the extreme, for some sampling applications, it may be appropriate to use a soft container such as a bag with a simple roll down wire closure or plastic zipper.

There are advantages in some cases for the container to be clear and to have graduations indicating fill volume. In another case, the container can be made to allow direct testing of the samples and reading results. In this case, one or more reagents can be added to the sample, enabling incubation and/or reactions to occur, and results to be read directly. The container's materials will not interfere with such a function. There may be an advantage to have an opening in the closure that can be used for adding liquid to aid in the analysis process, to close during incubation or reaction time, and to withdraw the mixture through the opening without removing the lid such avoid contamination. The ability to open and close this opening enhances this utility. In some embodiments, the container may have a label or labeling area that facilitates recording of sampling and sample location. Such a label can be a bar coding system, QR coding, or use RFID detection.

D. Actuator

In another aspect, the sampling device includes an actuator. In some embodiments, the actuator is configured to provide guidance for the sampling process. In some embodiments, the actuator is configured to provide powered movement to move the sampling head and therefore move the sampling media across the surface. The guidance will dictate how and where to moving the sampling media. Inertial and/or positional sensors such as those used in cell phones can monitor displacement and speed. A pressure transducer can monitor the force applied during the sampling process. In some embodiments, the sensors are coupled to indicators (e.g. audible or visual) that indicate to the user when a minimum pressure is met, or when the rotational force is applied or completed. In some embodiments, the actuator is configured to provide the rotational movement after sensing that the minimum required sampling pressure is achieved. These aspects guide the user to perform sampling in a manner consistent with the sampling protocol. The duration of the sampling is another feature that facilitates standardization. A timer can monitor how long the sampling pressure is applied and indicate to the user when a minimum duration of time has elapsed. An indicator (e.g. LED, screen display) can be used to communicate actions and corrective actions to the operator. In some embodiments, the sampling device records and/or communicates any of the sensor/timer measurements described above for association with the sample (e.g. sample log). The measurements can be recorded with an identification associated with a particular sample. These features can be downloaded each time the sampling device is used, or multiple sample logs can be downloaded periodically from the sampling device. In some embodiments, the sampling device automatically records/communicates the sampling data to the sampling system so as to further simplify and streamline sampling. Such an approach ensures that repeated sampling meets the require sampling protocol and that sample logs are accurate.

The actuator will generally have a power source, usually a battery that will drive a motor to provide motive force for the sampling. Simple rotational motion provided by a motor is the most common. However, various other oscillations can be used to better mimic manual sampling techniques. The use of rechargeable batteries for devices of this type is well known. The sampling device can be charged directly with a cord, connected to a docking station or use the proximity charging systems that are appearing for small devices. For field operations, the use of a solar array for recharging may be advantageous.

Although considered more cumbersome, mechanical energy from a spring could be used to provide motive force for the sampling. Alternatively, the operator could squeeze a trigger or lever to provide mechanical energy to provide motive force. There may be sampling operations where this is a preferred approach because of the ignition hazard of electrical power.

For increased functionality, the actuator may be equipped with a light source to illuminate the sampling target. The actuator should include enough metal to be rejected by a metal detector for many operations.

E. Additional Features/Functionality

There are many features that can be used in combination or separately to yield the same functionality when placed across multiple components, for example, the actuator of the sampling device, the base station and the data system. Given that some of these functions involve only data, the use of a computer, cell phone or tablets utilizing data processing and communication features configured for use with the samping system and/or samping device described hereincan have important advantages. However, these same features can be built into a new device leveraging this same technology. Thus, the placement of these functions described here below is exemplary with numerous other arrangements being possible.

- Automatic generation and recording of meta data such as sample location, date, time, operator, sample type and communicating to either a local database or communicating to the cloud.
- The system can include a data logger that provides feedback to the operator during sampling by a print out or by a visual display or monitor.
- Barcode generating and scanning to track physical samples and facilitate analysis (which avoids possible errors an operator or analyst in transcribing data.)
- Voice recording converting voice-to-text can allow descriptive details to be captured without the need for a more traditional keyboard for data entry.
- The various modules can be connected by physical connections such as when the actuator is connected to the based station or wireless connections such as Wi-Fi, cellular (e.g. 4G LTE) or Bluetooth are also possible.
- Metal Detectable.
- Identifying and reporting sampling location is important for visualization of the resultant information. A GPS or enhanced positioning system with higher resolution can be linked to mapping software, thus increasing the utility of the system.

III. Examples

The following embodiments depict detailed examples of sampling devices and methods of sampling, workflow and management in accordance with the inventive concepts described herein.

FIG. 1 shows an exemplary sampling device 30. Sampling device 30 includes a main body having a proximal handle 32 and an actuator 34 from which extends a shaft 36 that interfaces with the sampling head portion carrying sampling medium 10, which facilitates rotation of the sampling head portion during sampling. An indicator 38 (e.g. LED) on the sampling device body can indicate to the user when sufficient pressure is applied and/or when a sufficient duration of time has elapsed, or can indicate various other sampling conditions. The sampling head portion includes a lid 21 from which a rod extends distally to sampling medium 10. Lid 21 is sealed atop sample container 20 such that sampling medium 10 is contained within the sample container 20 before and after sampling. Typically, the shaft and the rod are substantially rigid to allow the user to press forcibly with the sampler against the surface being sampled.

Figure 2A:
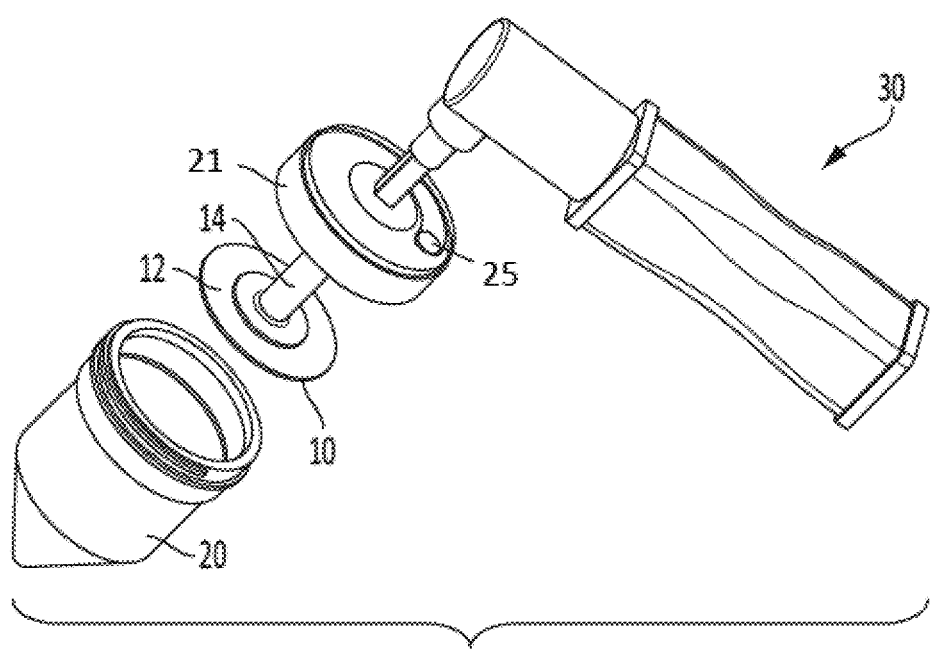
FIGS. 2A-2B show views of the exemplary sampling device of FIG. 1 with the sampling medium withdrawn from the sampling container.
Figure 2B:
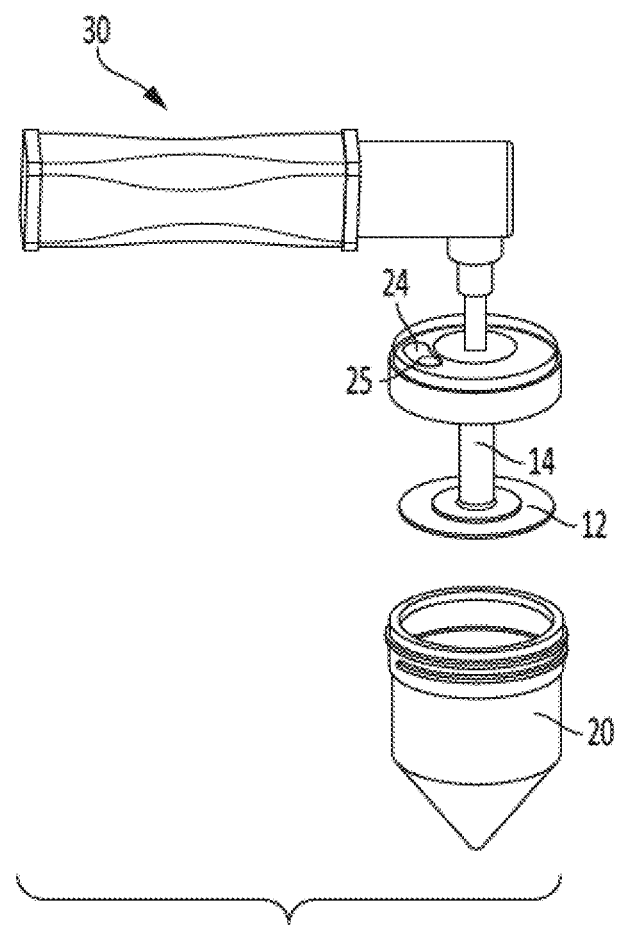

As can be seen in FIGS. 2A-2B, when the sampling head portion is withdrawn from sample container 20, the rod 14 extends to a sample medium support 12, the underside of which attaches to the sampling medium 10. The sample container 20 and rod 14 are dimensioned such that the sampling medium 10 is suspended within the sampling container so as to maintain the integrity of the sampling surface before and after sampling. The lid can include fill openings 25 to allow an additive to be added to the sampling container after sampling, as described previously.

Figure 3A:
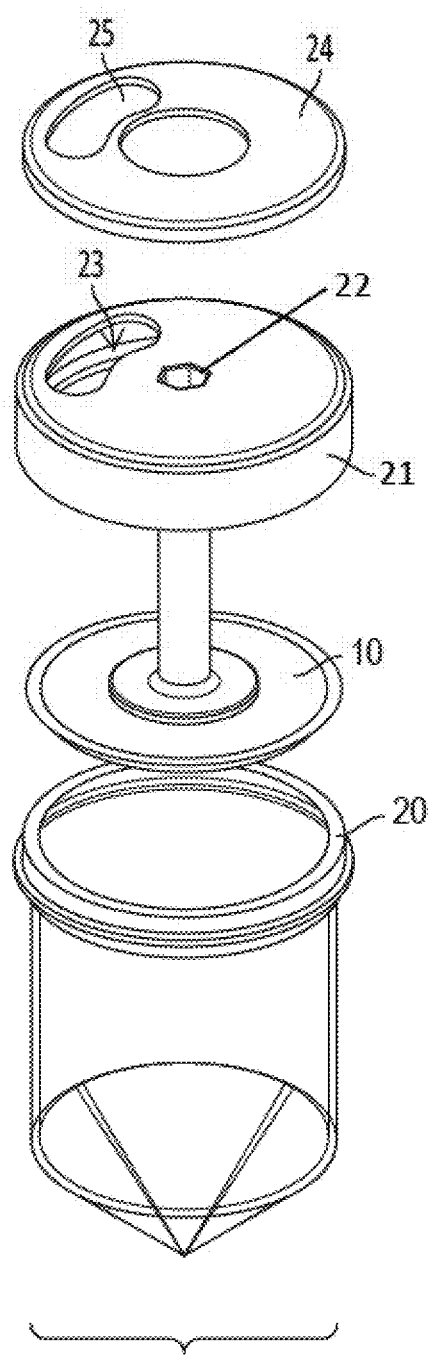
FIGS. 3A-3B show a sampling head with sampling media and a sample container of the embodiment of FIG. 1.
Figure 3B:
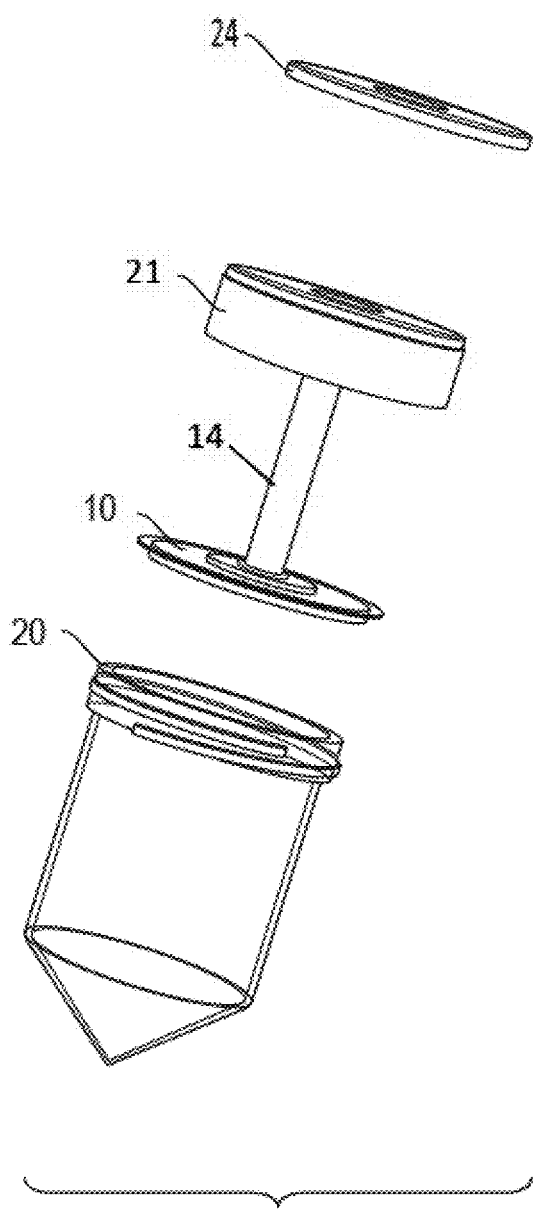

As can be seen in FIGS. 3A-3B, the lid portion includes a main lid 21, which is attached to rod 14, that sealingly engages (e.g. by inner threads) with the outer threads along the top of sample container 20. The lid portion can further include an overlay lid 24 having fill opening 25 to allow access through another opening 23 in lid 22. A central opening 22 allows for passage of the actuator through the rod to facilitate rotation of the sampling member during sampling. In this embodiment, the sample container 20 is partly cylindrical but has a conical distal portion, which allows additional space between the sampling member 10 and the bottom of the sampling container.

Figure 4A:
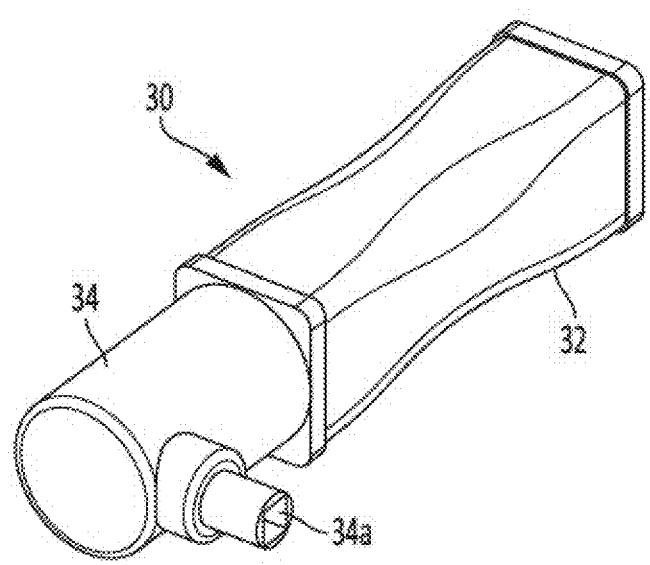
FIGS. 4A-4B show the actuator portion of the sampling device of the embodiment of FIG. 1.
Figure 4B:
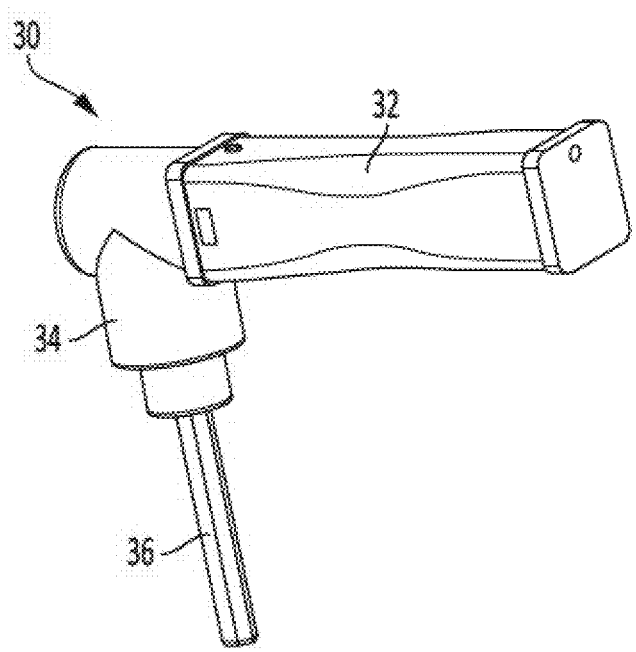
Figure 8A:
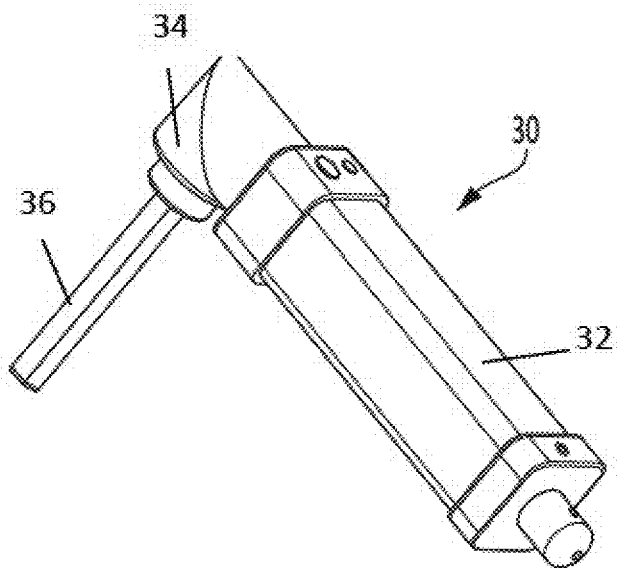
FIGS. 8-18B show alternate designs of the actuator portions of the sampling device, in accordance with some embodiments.
Figure 8B:
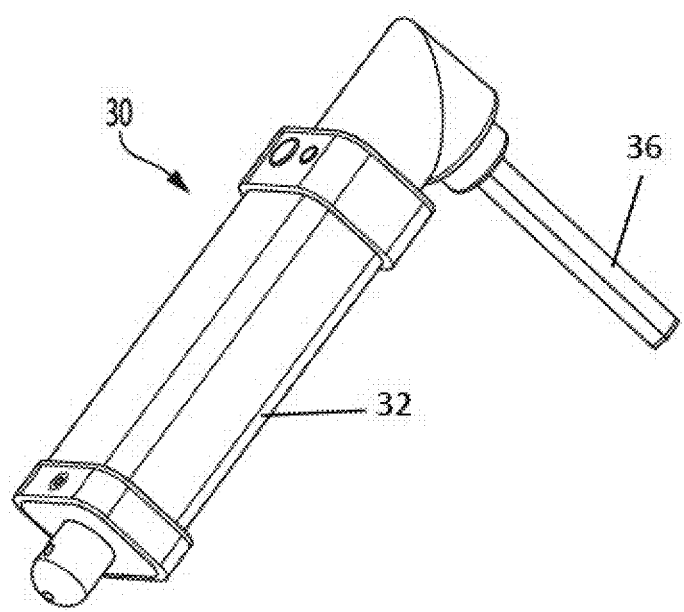
Figure 9A:
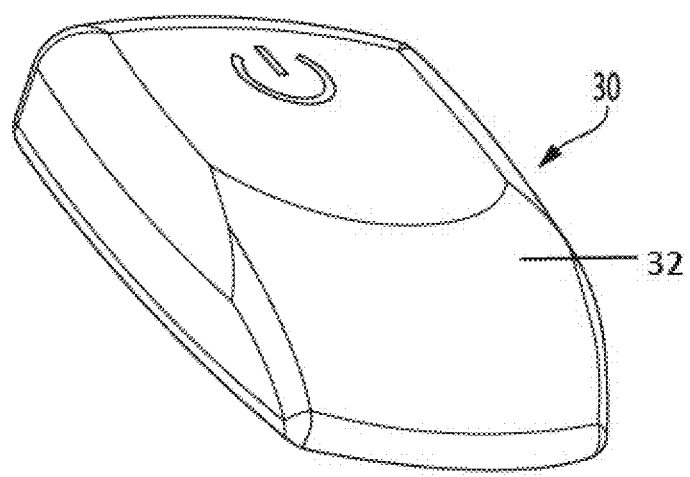
Figure 9B:
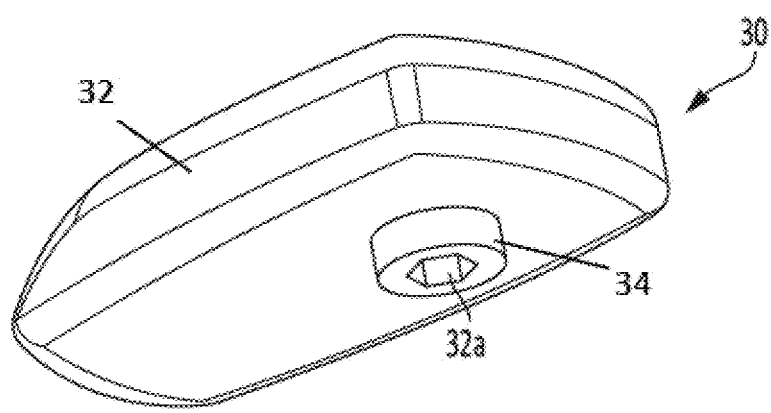
Figure 10:
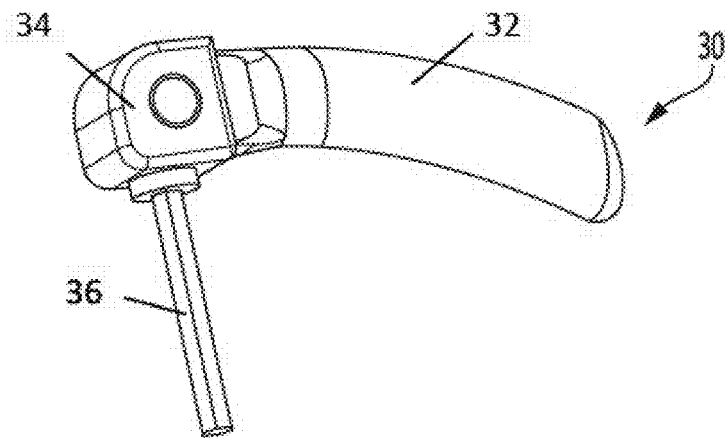
Figure 11:
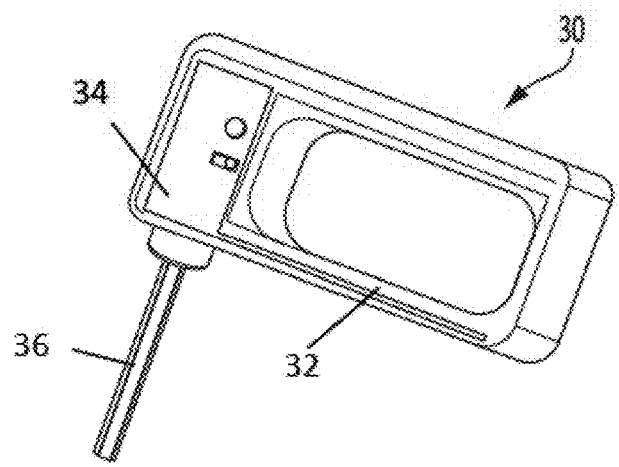
Figure 12:
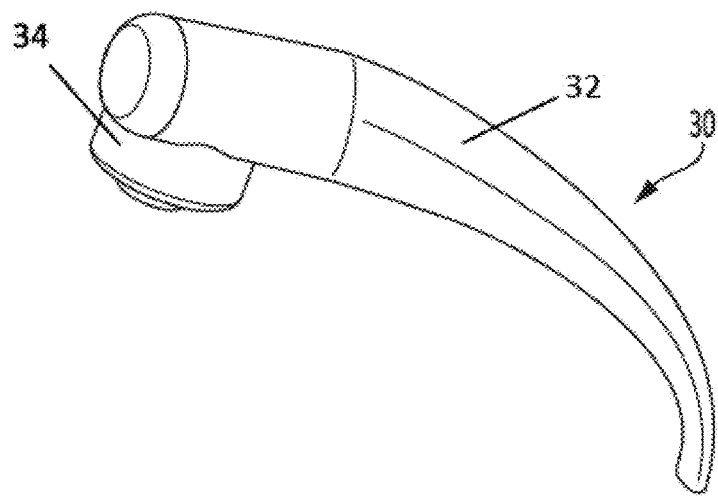
Figure 13A:
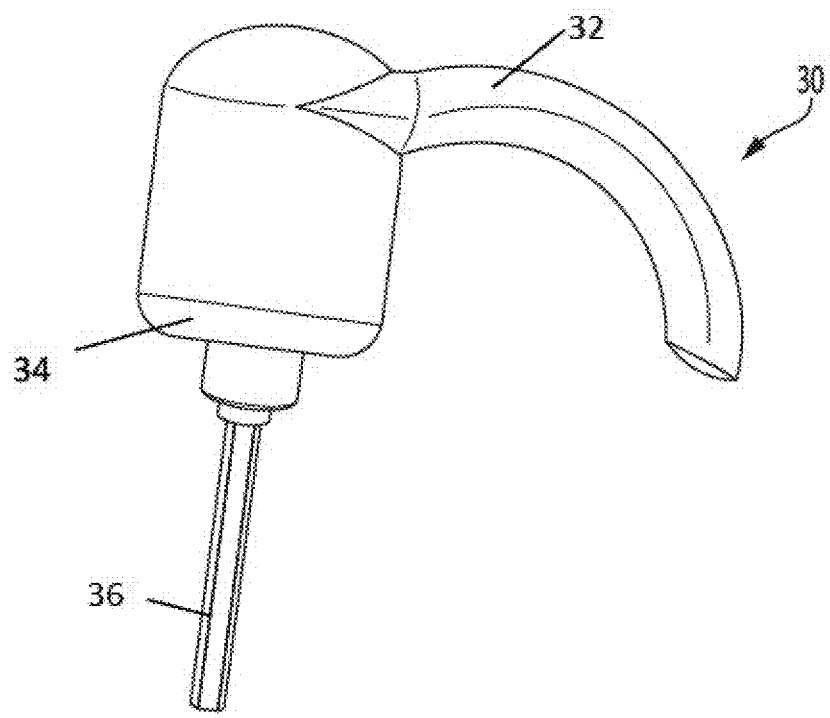
Figure 13B:
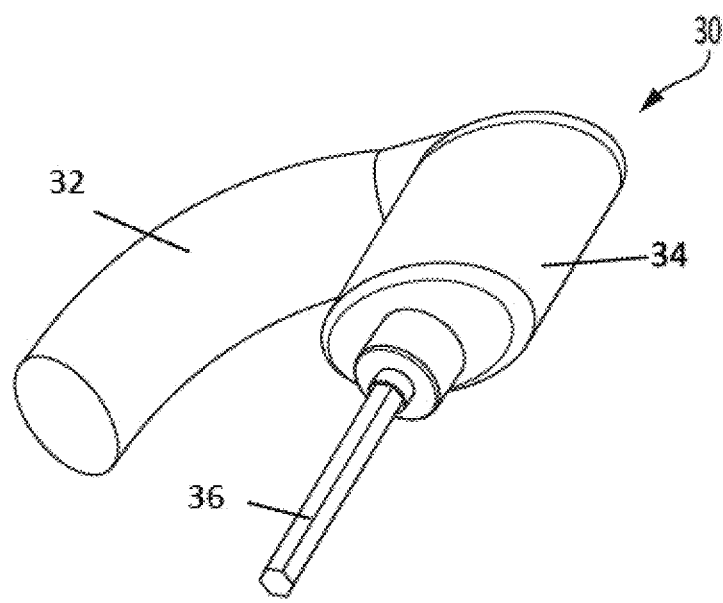
Figure 14:
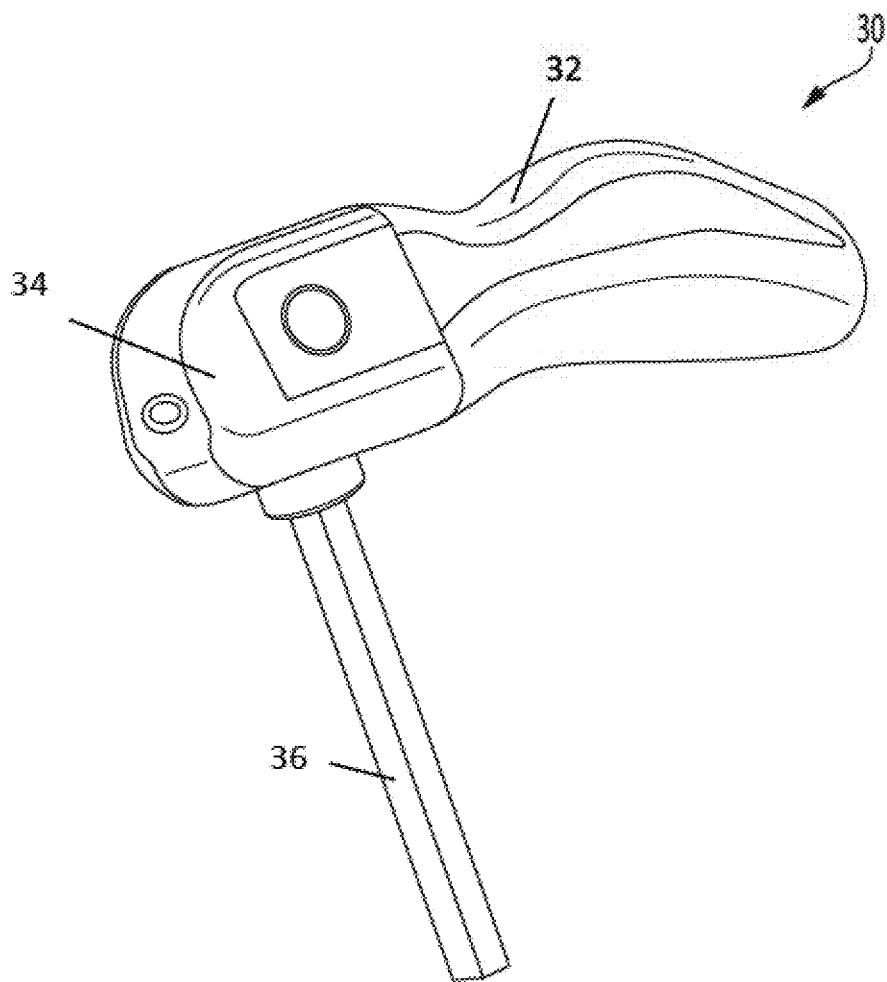
Figure 15A:
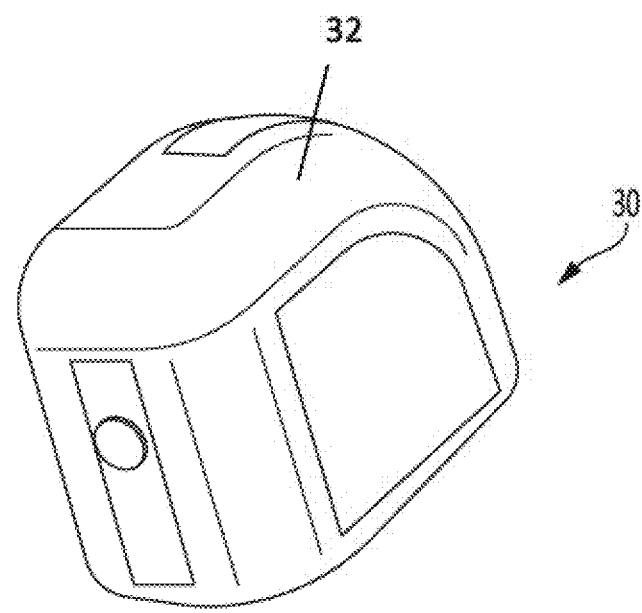
Figure 15B:
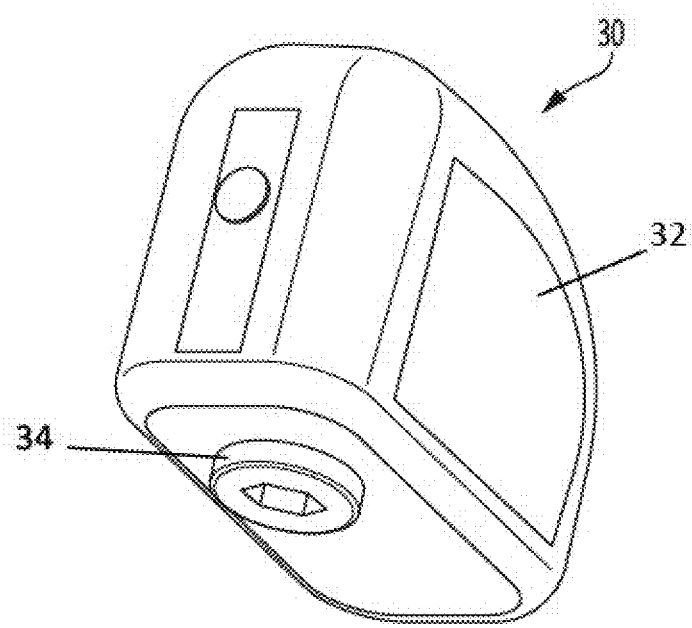
Figure 16A:
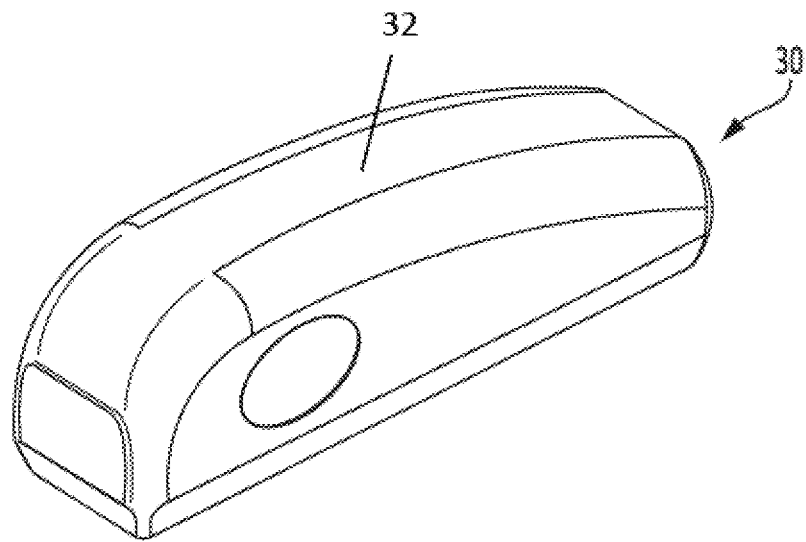
Figure 16B:
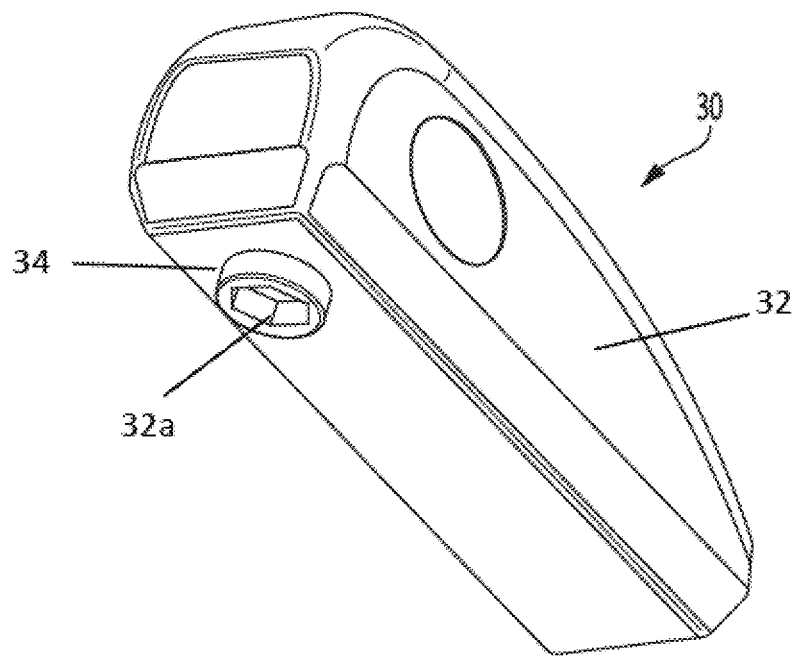
Figure 17A:
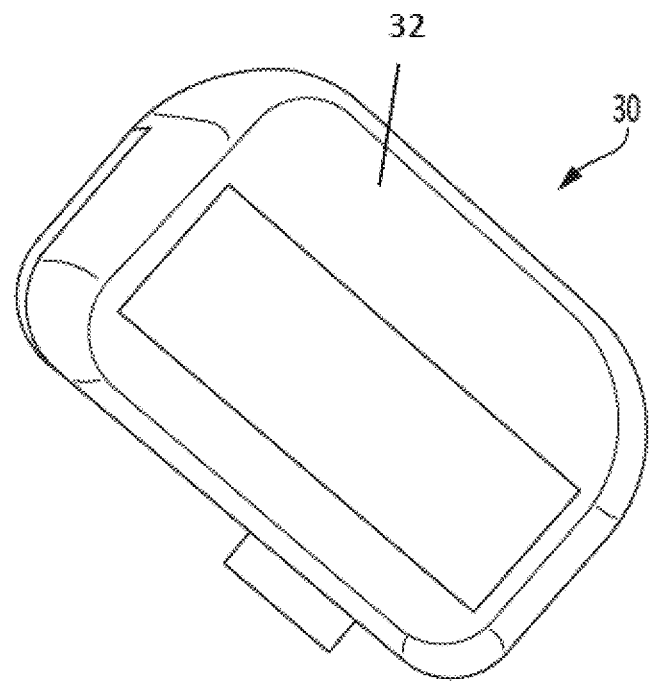
Figure 17B:
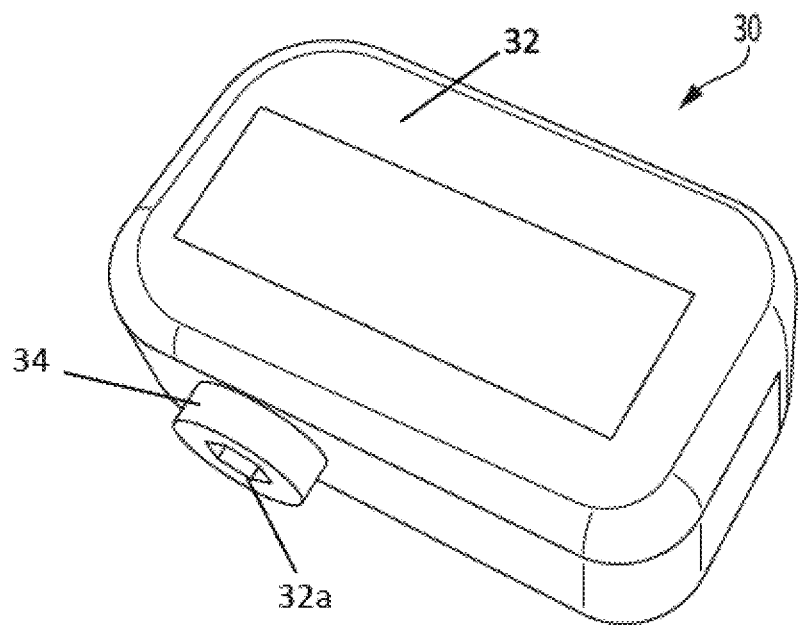
Figure 18A:
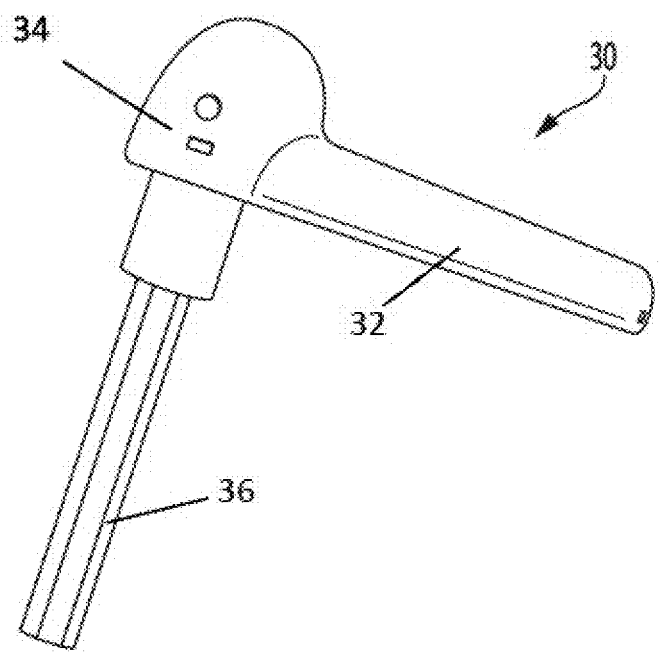
Figure 18B:
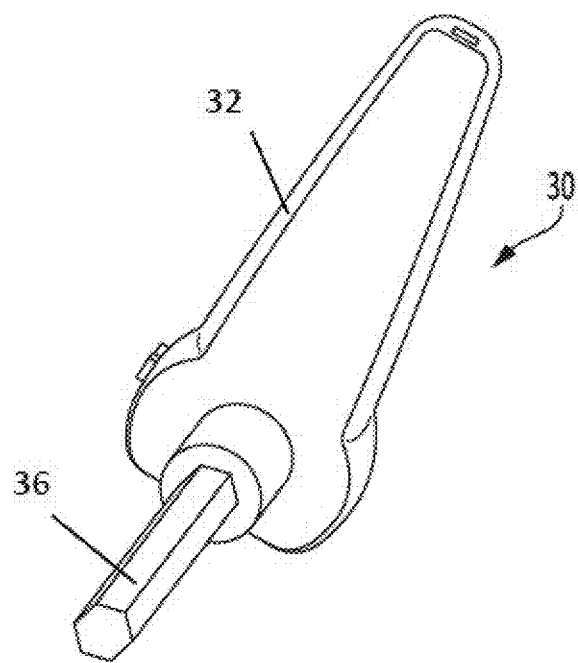

FIGS. 4A-4B show the actuator portion of the sampling device 30 of the embodiment of FIG. 1. The proximal handle 32 allows a stable portion of the sampling device 30 that can be held by the user during sampling and by which the user can apply pressure to the surface to be sampled. The actuator portion 34 includes a rotatable connector 34a that interfaces with shaft 36, which in turn, interfaces with a correspondingly shaped connector receptacle 22 in the top of lid 21 (see also FIGS. 5A-5B).

FIGS. 5A-7 show a lid embodiment of sampling head portion in which main lid 21 includes a fill opening 23 shaped as a curved slot and an overlay lid 24 that includes a circular fill hole 25. The overlay lid includes a large central opening 24a to allow the shaft 36 of the actuator to interface with the corresponding square-shaped connector receptacle 22 in lid 21. Overlay lid 24 includes an outer lip 24b that sealingly engages with a top outer edge of main lid 21 such that the lid assembly can be sealed by rotating overlay lid 24.

FIGS. 8-18B show alternate designs of the sampling device main body 30 with actuator and handle portions of the sampling device, in accordance with some embodiments. Each includes a proximal handle portion 32 and a distal actuator portion having an actuator connector (see hexagonal connector 32a in FIG. 9B) for attaching the actuator shaft 36. As described above, it is appreciated that such designs could use any suitable connector type or actuation means suitable for imparting movement to the sampling head portion.

Figure 19A:
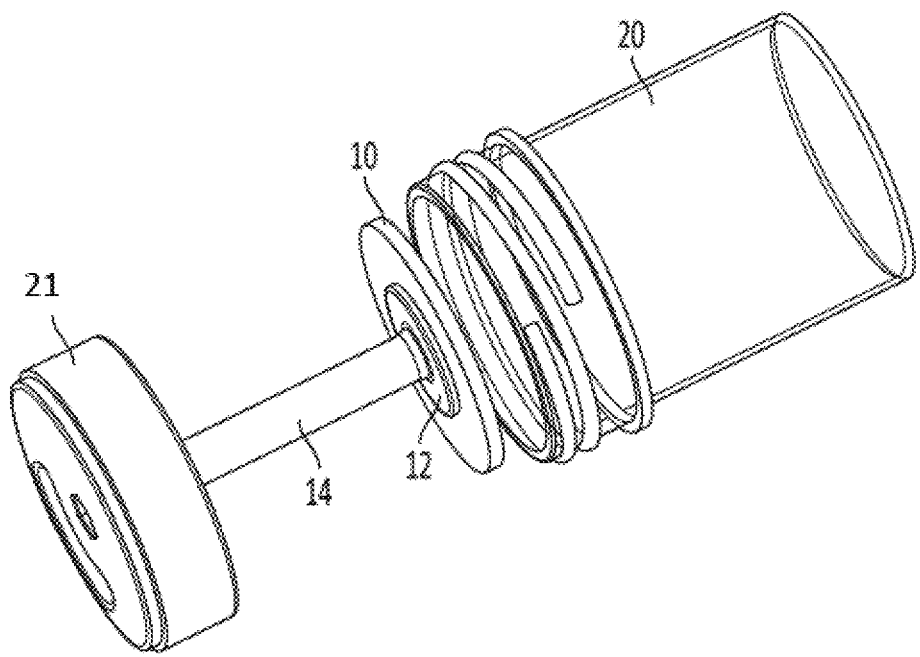
FIGS. 19A-19B show a sample kit having a sample head and sample container, in accordance with some embodiments.
Figure 19B:
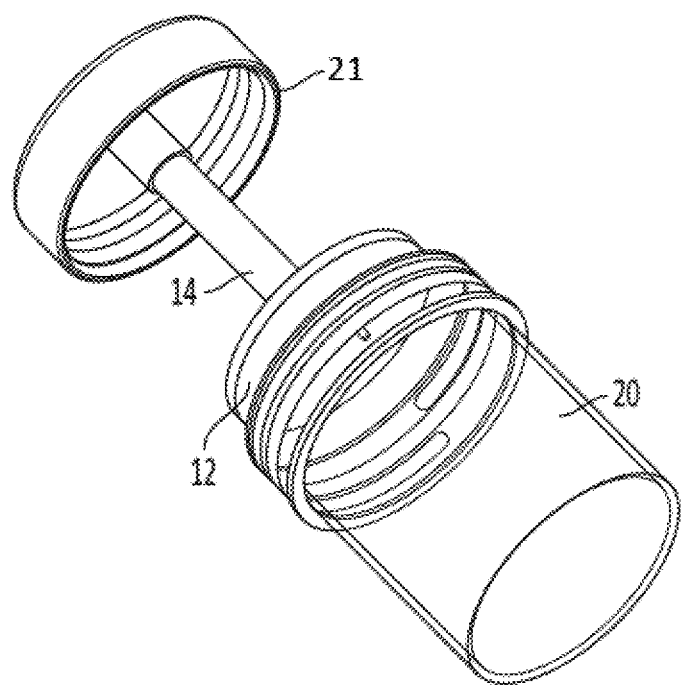

FIGS. 19A-19B illustrate an alternative sampling head design, with the same or similar features as the embodiment in FIGS. 3A-3B, except the sample container 20 is of a standard cylindrical shape with a flat bottom.

In a specific embodiment, the sampling medium includes two interdigitated crosses of cellulose sponge wetted with phosphate buffer that are attached to a sampling head that fits in a standard 50 ml conical centrifuge tube sample container. The closure can be a liquid tight slip on cover. The actuator can be a simple right angle rotational tool with an intrinsic timer (e.g. 20 second timer) assuring that sampling times are standardized. Other aspects of sampling can be handled in the usual ways. It is appreciated that this is but one example and any of these aspects can be designed according to a particular application or sampling protocol.

Figure 20:
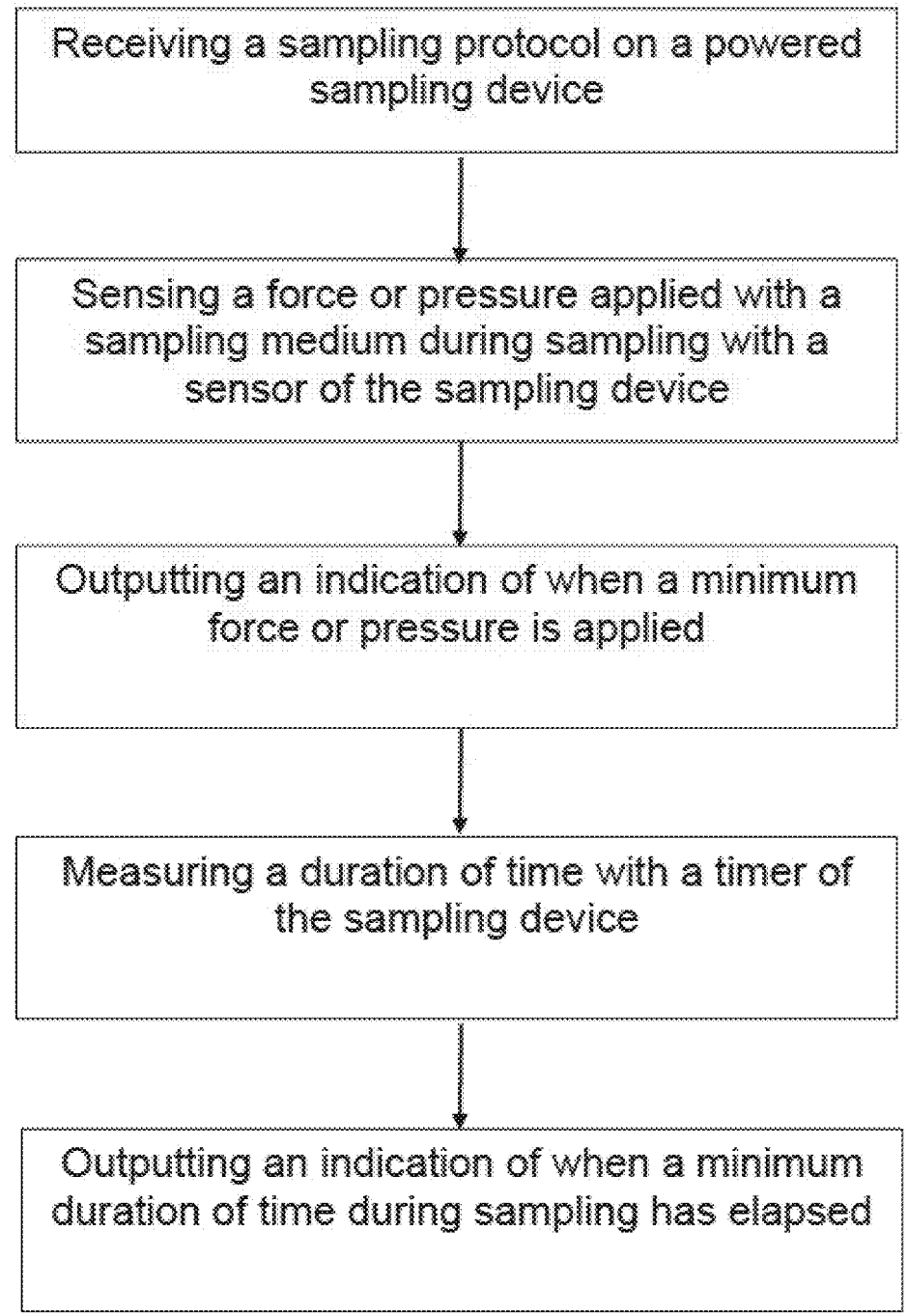
FIGS. 20-21 show methods of sampling in accordance with some embodiments.
Figure 21:
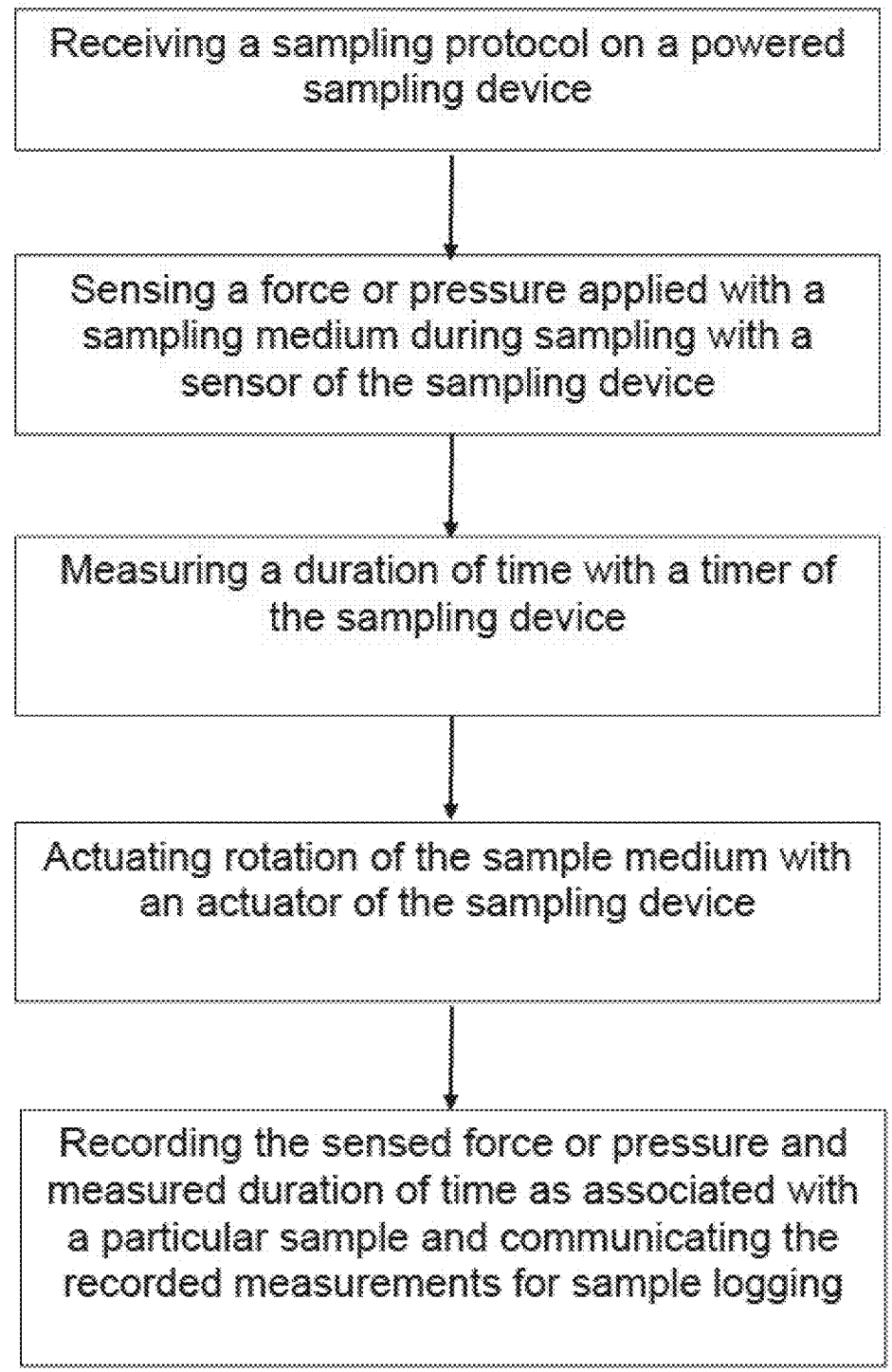

FIGS. 20-21 show methods of sampling in accordance with some embodiments. It is appreciated that such methods can omit certain steps or include various other steps such as any of those described herein and still be in accordance with the principles of the invention described herein.

Figure 22:
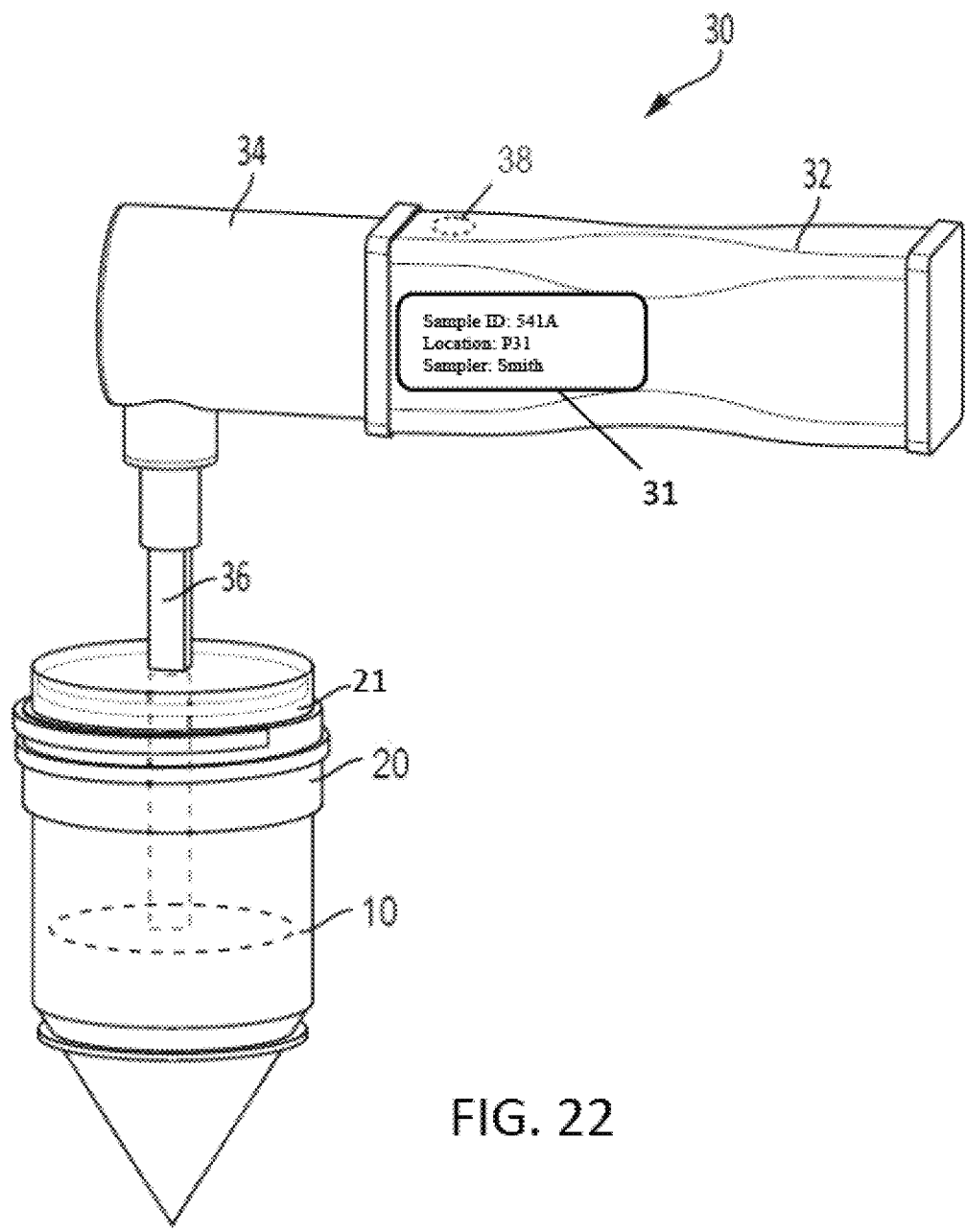
FIG. 22 shows an exemplary sampling device with an attached sampling kit in accordance with some embodiments.
Figure 23:
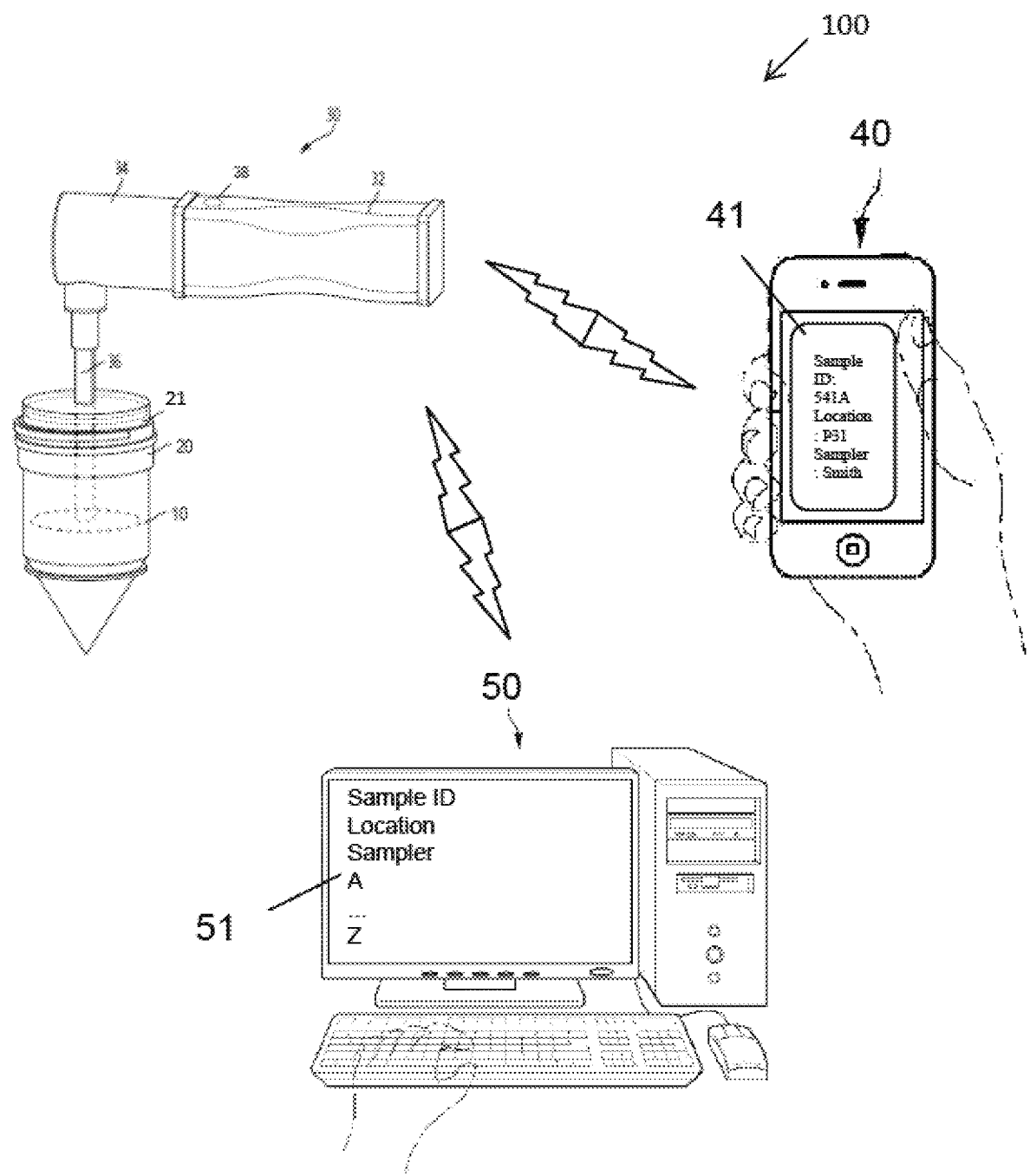
FIG. 23 shows an exemplary sampling system utilizing an exemplary sampling device in communication with various computing devices in accordance with some embodiments.

FIGS. 22-23 show examples of a sampling device 30 having additional features and functionality to facilitate further improved sampling and standardization of sampling. The sampling device includes a display 31 that is communicatively coupled to a processing module configured such that the display communicates one or more attributes of sampling to the user and/or a sampling administrator. In some embodiments, the one or more attributes presented on the display include, but are not limited to: date, time, operator/sampler, location of sample collection, and type of sample. As shown in FIG. 22, the display 31 is incorporated into the sampling device 30 itself. In some embodiments, the display 31 merely displays the sampling attributes associated with the sample, while the sampling information can be entered through an external device communicatively coupled to the sampling device. The external computing device can be a user's smartphone, tablet or another computer. In other embodiments, the display 31 can be a user interface that allows the user to input sample information directly. The sampling information can later be uploaded to another computer or server.

FIG. 23 shows a sampling system in which the sampling device 30 is communicatively coupled to additional computer device 40, 50. The display can be disposed on one or more separate computing devices wirelessly coupled to the sampling device, such as display 51 on desktop computer 50 or display 41 on smartphone 40. The sampling device can be used in conjunction with a system of devices, such as a user's portable computing device or smartphone 40 as well as a laptop or desktop computer 50. In some embodiments, this approach allows for additional functionality, for example, communication to and from the sampling management unit, as described further below.

Figure 24:
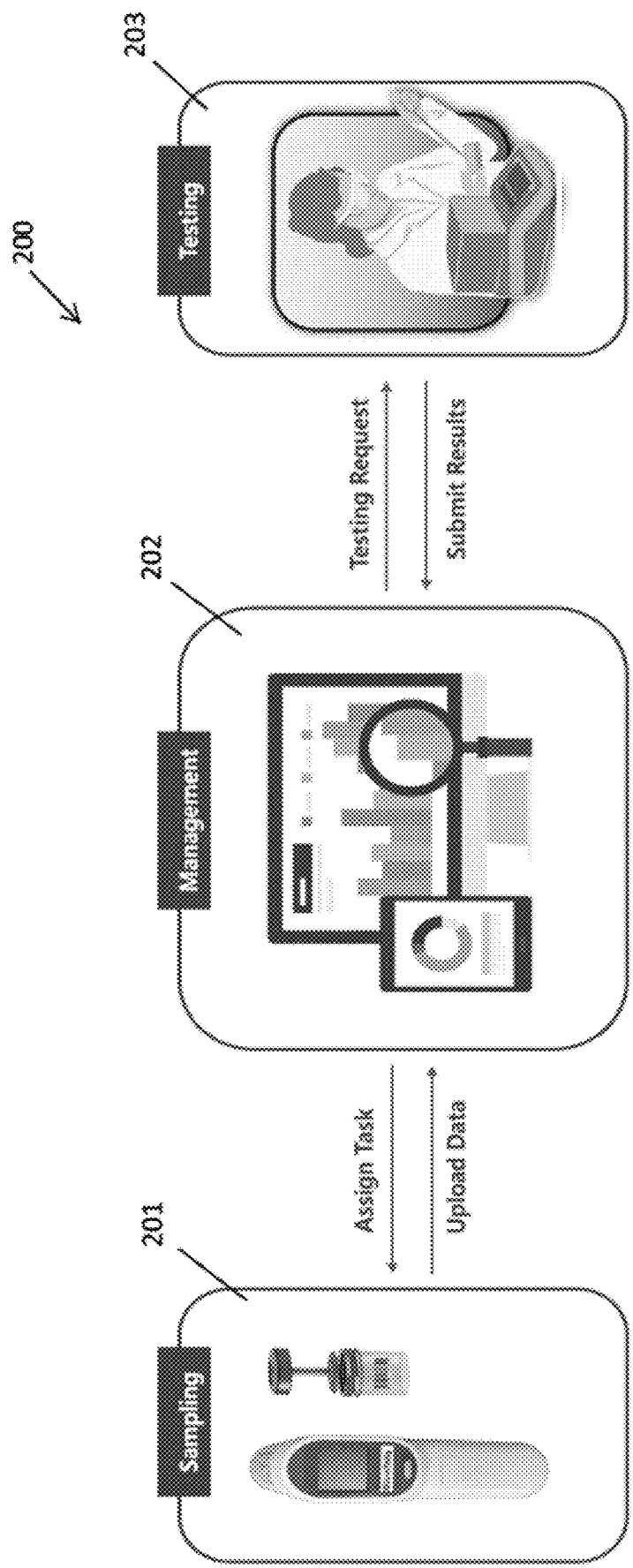
FIG. 24 shows an exemplary sampling system framework and associated functionality in accordance with some embodiments.

FIG. 24 shows an exemplary sampling system framework 200 and associated functionality in accordance with some embodiments. The framework 200 includes three main parts, the sampling unit 201, management unit 202 and testing unit 203. Each of these units can receive input and feedback into each other unit. Typically, the sampling unit 201 feeds sampling data into the management unit, by uploading of sampling data, while the management unit 202 feeds back to the sampling unit 201 by assigning tasks in regard to sampling. The samples are sent, by the management unit 202, to the testing unit 203. The management unit 202 facilitates functionality of the testing unit 203 by submitting a testing request to the testing unit, along with the test samples, and outputting sampling information associated with the sample to the testing unit 203 (laboratory). In turn, the testing unit feeds back the testing results to management unit 202 for processing.

The sampling unit 210 includes sampling hardware that includes the powered sampling device and sampling head, such as any of those described herein. In some embodiments, the sampler includes an imager (e.g. barcode scanner, RFID detector, etc). The sampling head includes a sampling member to obtain samples and a sample container (e.g. vials, jars) to preserve the samples after sampling. Other features/ functionality of this unit can include: associating other sampling information with the sample (e.g. operator, date and time), a sampling spot recognition function (e.g. GPS, location detector), and barcode recognition.

The management unit 220 address management aspects of sampling, which can include coordination and assigning of sampling, as well communicating and associating sampling information before, during and after sampling. Hardware associated with the management unit can include any of: a portable computing device (e.g., smartphone, tablet), a laptop or desktop computer, a server, or any combination thereof. Other features and functionality associated with the management unit 220 can include any of: sampling area and spot setup (e.g. mapping), sampling planning, plan tracking and verification, data transfer and analysis, sampling and testing reports, sampling traceability, and sampling result alarms.

The testing unit 230 can includes various analytical hardware, such as a barcode readers, automatic liquid filling machines, testing/analysis machines, as well as various computers (e.g. smart phone, tablet, laptop, desktop personal computer). Other features and functionality can include any of: barcode recognition, sample matching, and automatic upload of testing results.

It is appreciated that the above features of the framework are exemplary and that one or more features could be excluded or additional features included. Further, it is appreciated that input/output and feedback between the units could be automatic, performed by a user through the use of prompts, or any combination thereof.

Figure 25:
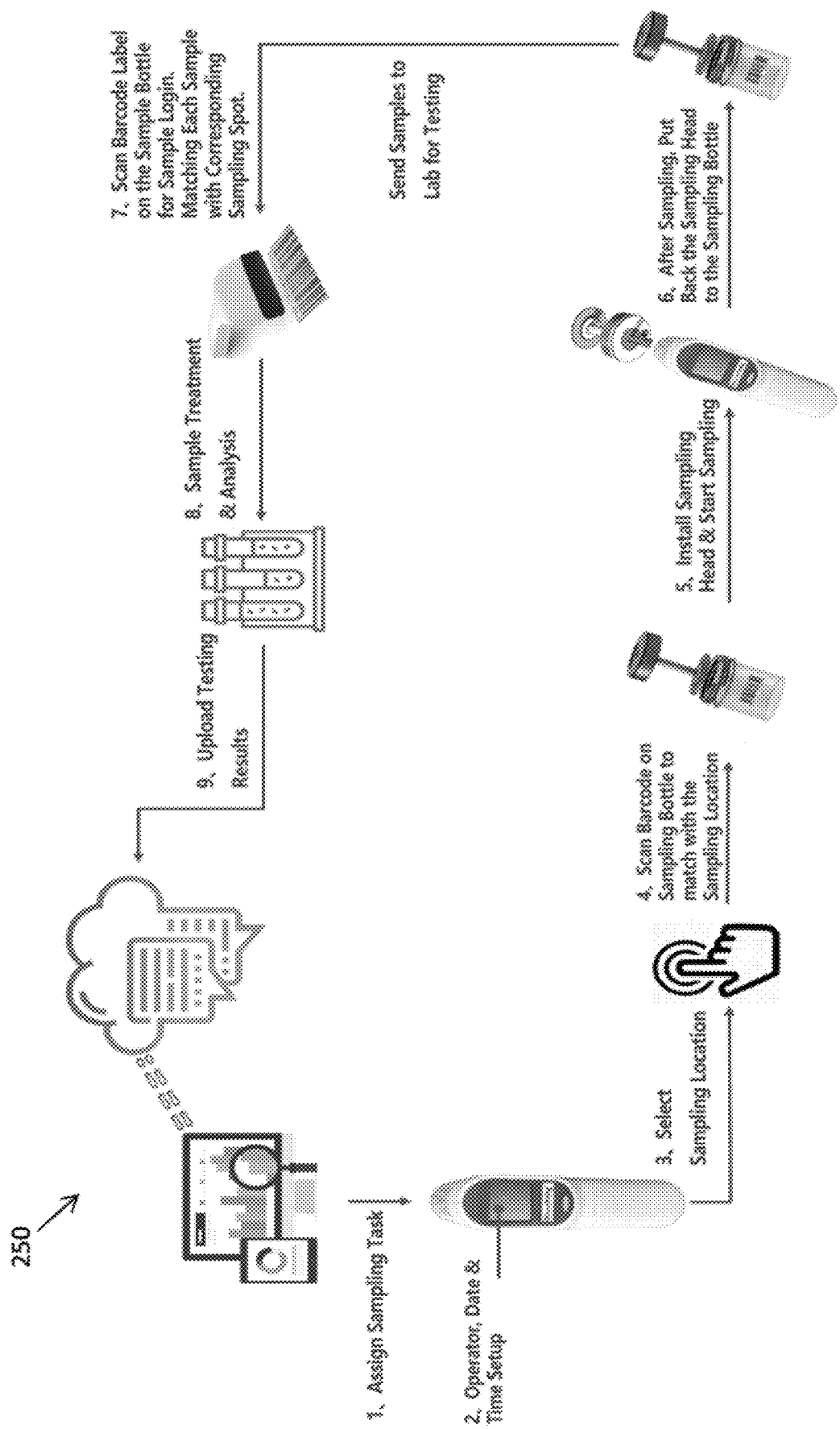
FIG. 25 shows an exemplary sampling system workflow in accordance with some embodiments.

FIG. 25 shows an exemplary sampling system workflow in accordance with some embodiments. The workflow 300 includes a first step of assigning the sampling tasks, which can be performed by the management unit described above. Next, in step 2, the workflow obtains the operator, date and time setup information by the powered sampling device. In step 3, the sampling location is selected, which may be an input by a user into the sampling device or can be automatically performed by the sampling device (e.g. through GPS, image scanning or location detection). In step 4, the sampling device scans the barcode on a sampling container (e.g. jar, vial) so as to record the identify the sample to be taken and associate the sample ID with the sampling location and/or other sampling information (e.g. time/date, operator, sampling attributes, etc.). In step 5, the user installs the sampling head, which includes the sampling member, onto the powered sampling device and then starts sampling. In step 6, after sampling, the user removes the sampling head with the sampling member and places back onto the sample container. After sampling, the samples are send to the laboratory for testing. In some embodiments, the management unit may facilitate organization of sampling information to the lab. In step 7, each sample is identified. In some embodiments, this entails scanning a barcode label on the sample container for the sample login, matching each sample with a corresponding sampling spot. In step 8, sample treatment and analysis is performed, which can be performed by the testing unit. In step 9, the testing results are uploaded, which can then be submitted to the management unit, which can generate the sampling result reporting, generate alerts, and/or determine the need for further sampling as appropriate.

Figure 26A:
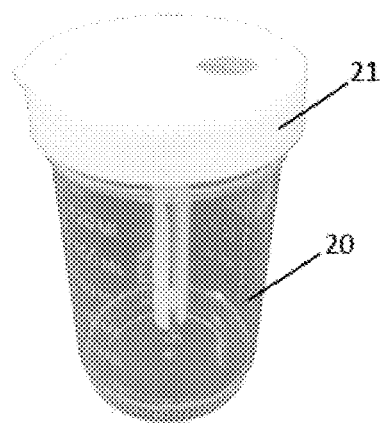
FIGS. 26A-26C shows an exemplary sampling kit, including a sample container and sampling head with attached sampling member in accordance with some embodiments.
Figure 26B:
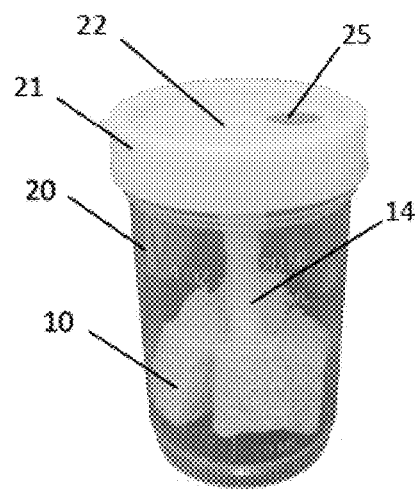
Figure 26C:
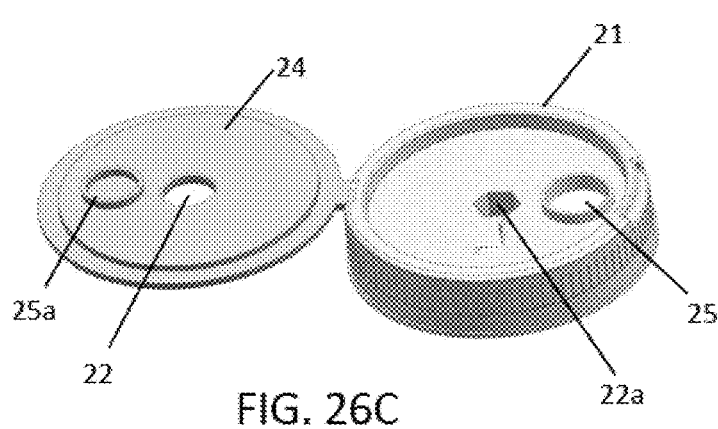

FIGS. 26A-26C shows an exemplary sampling container with integrated sampling member and container lid in accordance with some embodiments. Similar to previous sampling heads, this embodiment includes a main lid 21 from which a rod 14 extends distally to a sampling member 10. As shown in FIG. 26C, the main lid 21 includes a central hexagonal opening 22a for the passage of the actuator, and a circular fill opening 25. The overlay lid 24 includes a circular fill opening seal 25a that sealingly engages about the fill opening 25 when the interface lid 24 is placed atop the main lid 21. The overlay lid 24 also includes a central opening 22 through which the actuator extends.

Figure 27A:
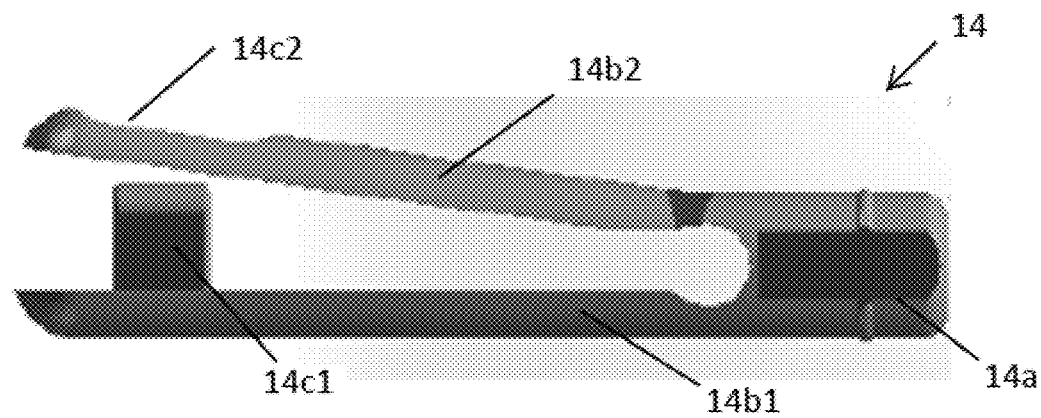
FIGS. 27A-27C shows another exemplary sample rod for securing a sampling member in accordance with some embodiments.
Figure 27B:
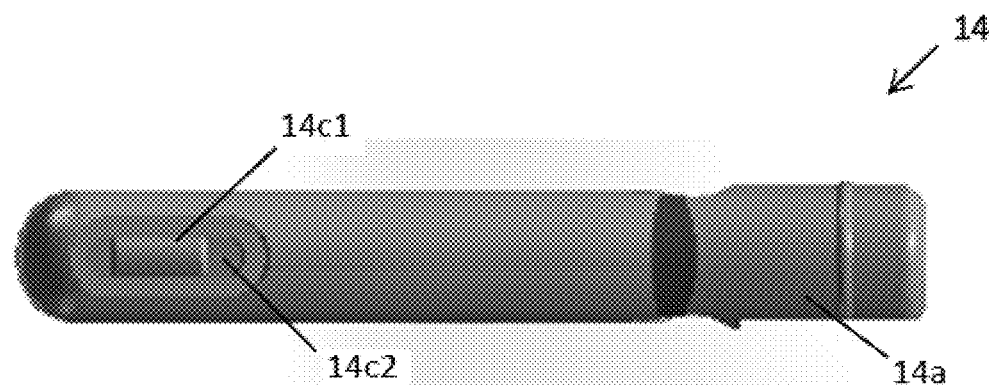
Figure 27C:
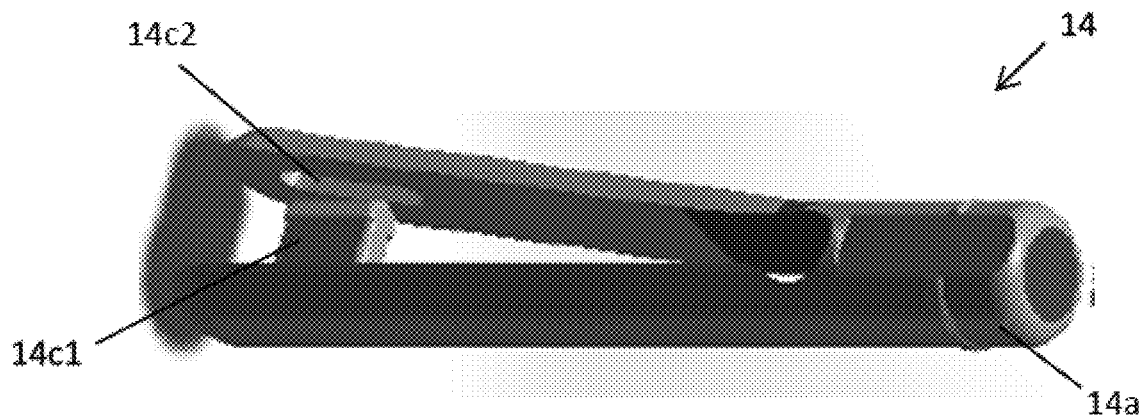
Figure 28A:
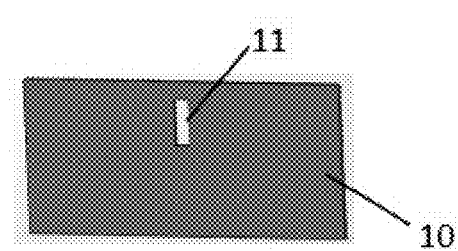
FIGS. 28A-28D shows an exemplary sampling head with sampling member before and after sampling in accordance with some embodiments.
Figure 28B:
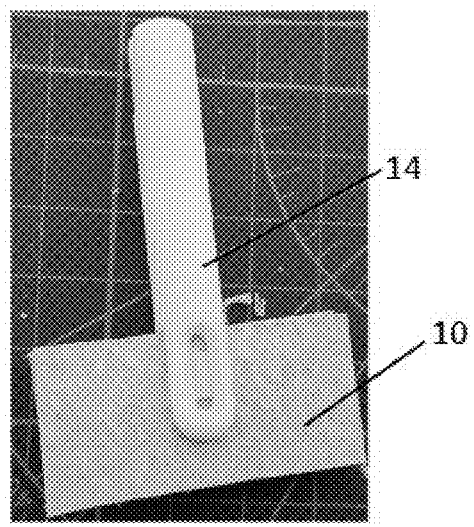
Figure 28C:
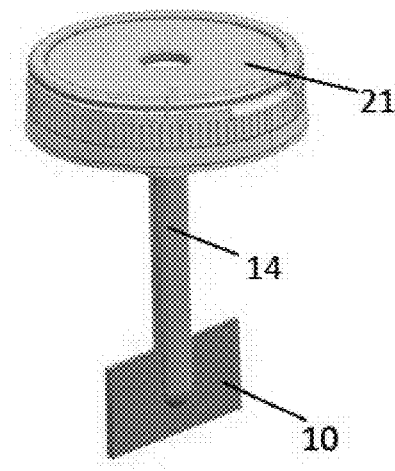
Figure 28D:
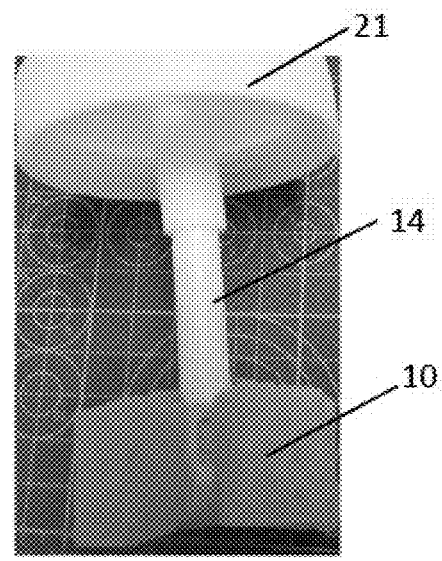

FIGS. 27A-27C shows an exemplary sampling member rod 14 of the sampling head in FIG. 26B. This rod design allows the sampling member to be easily attached to the end of the rod 14 to facilitate sampling and removed after sampling if needed. This is advantageous as it allows the sampling medium to be readily exchanged or replaced if a particular type of sampling medium is required for a particular application. In some embodiments, the sampling container is provided to the user with the sampling medium attached and the sampling medium can be used to sample and sealed within the sample container without ever requiring the user to exchange or replace the sampling medium. In the embodiment shown, the rod 14 includes a proximal base 14a that is fittingly received within a central receptacle of the main lid 21. As can be seen in FIG. 27C, the proximal base 14a can be shaped and include a ridge feature to facilitate attachment to the lid. From the proximal base 14a, two arms 14b1, 14b2 extend distally. At the distal end, one arm 14b1 include a peg 14c1 that extends into a corresponding recess or hole within the opposing arm 14b2. This design allows a planar sampling medium (e.g. sponge, cloth, gauze) having a central hole or slot (see FIG. 28A) to be placed over the peg while the other arm 14b2 is lifted. After placement of the sampling medium, the other arm is released and it resiliently returns to its non-displaced position to receive the peg within the corresponding hole, thereby securing the sampling medium in place. This approach allows the sampling medium to be easily removed if needed, but secures the sampling medium sufficiently to allow a suitable force and pressure to be applied during powered sampling. For example, the sampling medium may be pressed with a suitable force or rotated to impart a twisting motion to the sampling medium, as described previously.

FIGS. 28A-28D shows an exemplary sampling member and views of the sampling member mounted to the rod of the sampling head before and after sampling in accordance with some embodiments. In this embodiment, the sampling member is a piece of cellulose fiber to absorb liquid residue of the items being sampled. Preferably, the sampling member is of a suitable size to fit within the sampling container. Typically, sampling member is rectangular and between 0.5 in to 4 in in length and width, although it can be defined in any desired size and shape. In this embodiment, the sampling member 10 is rectangular in shape having a length of about 1.5 in. and a width of about 1 in. The retention hole 11 is formed along a central upper portion of the sampling member to allow the sampling member to be secured to the distal end of rod 14 and extend distally of the rod to facilitate sampling. In this embodiment, the retention hole 11 is about 2 mm×6 mm. This design allows the sampling member 10 to be contained within a standard sampling jar or vial having a height of about 3.5 in and a diameter of 2 inches. For most sampling applications, the sampling member and sampling container can be within 50% of the size dimensions noted above as this allows for suitable samples to be obtained and allows for collection of a large number of samples. It is appreciated that various other sizes and shapes of sampling containers can be used, which may necessitate differing sizes and shapes of the respective sampling member contained within.

Figure 29:
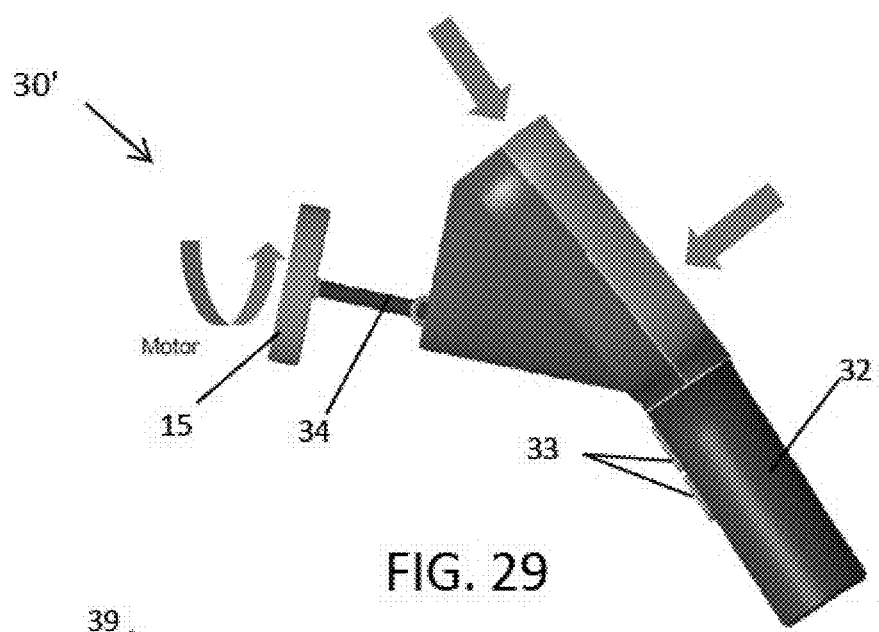
FIG. 29 shows an exemplary powered sampling device having a foldable actuator in accordance with some embodiments.
Figures 30A, 30B:
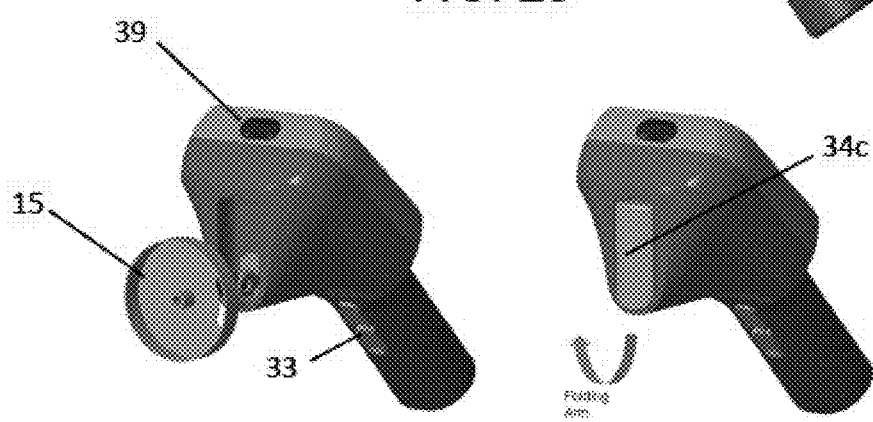
FIGS. 30A-30D show several views of the exemplary powered sampling device of FIG. 29 in accordance with some embodiments.
Figures 30C, 30D:
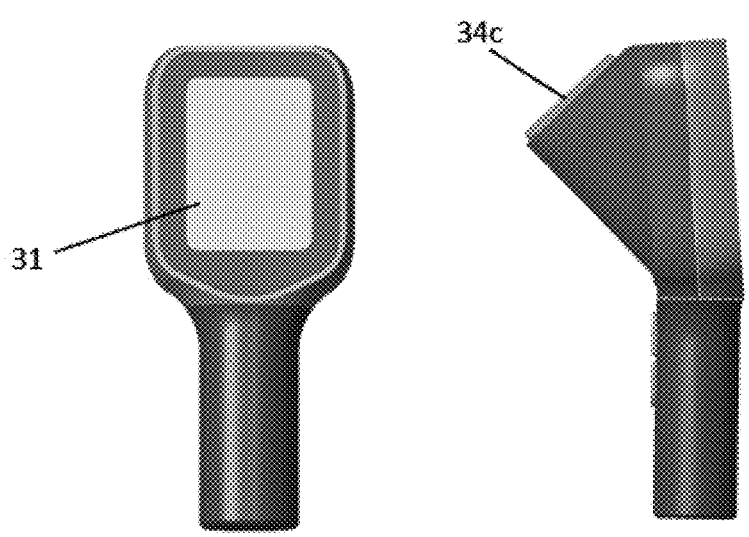

FIG. 29 shows an exemplary powered sampling device 30' in accordance with some embodiments. This design includes same, similar features (similarly referenced) as the previous design in FIG. 22, but includes an actuator design that folds upward into the main body of the sampling device, as can be seen in FIG. 30B. As shown in FIG. 30A, this design includes a cap 15 that interfaces with the lid 21 of the sampling head to further improve rotation of the sampling head during sampling. This design can further include a cover 34c' that covers the folded actuator arm. In this embodiment, a number of control buttons 33 on the proximal handle 32 for controlling the device. This design also includes a user interface 31 that utilizes a touchpad for displaying and receiving user input. This embodiment further includes a reader 39 (e.g. imager, scanner, detector) that allows the user to scan, image, or detect a sample location and/or a barcode of a sampling head to be used in sampling.

Figure 31:
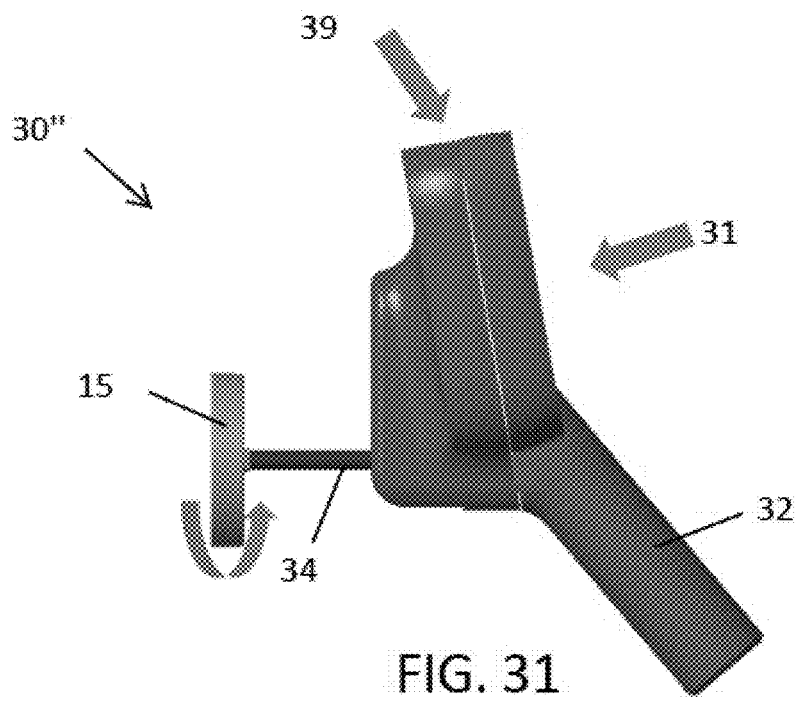
FIG. 31 shows an exemplary powered sampling device with foldable actuator in accordance with some embodiments.
Figures 32A, 32B:
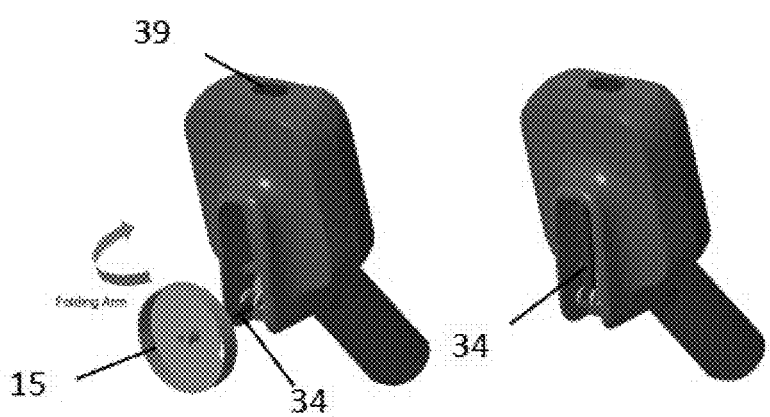
FIGS. 32A-32E show several views of the exemplary powered sampling device of FIG. 31 in accordance with some embodiments.
Figures 32C, 32D, 32E:
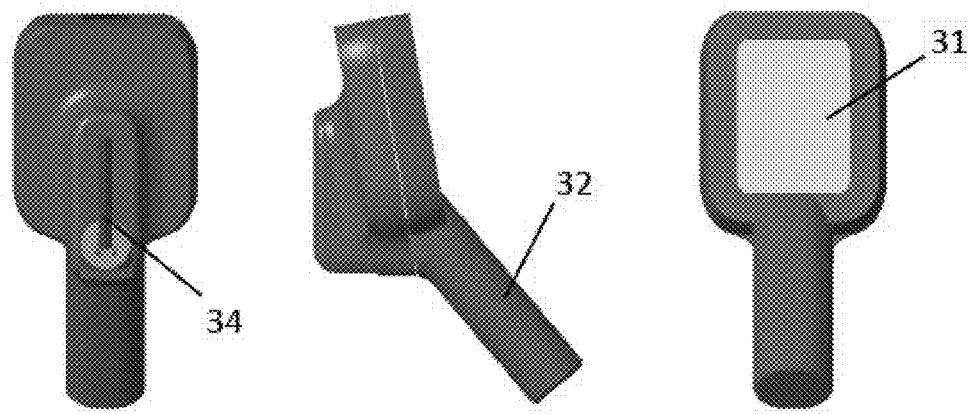

FIG. 31 shows yet another exemplary powered sampling device 30" in accordance with some embodiments. This design includes same, similar features (similarly referenced) as the previous design in FIG. 22, but includes an actuator design that folds upward into the main body of the sampling device, as can be seen in FIG. 30B. As shown in FIG. 30A, this design also includes a cap 15 that interfaces with the lid 21 of the sampling head to further improve rotation of the sampling head during sampling. In this embodiment, a number of control buttons 33 on the proximal handle 32 for controlling the device. This design also includes a user interface 31 that utilizes a touchpad for displaying and receiving user input. This embodiment further includes a reader 39 that allows the user to scan, image or detect a sample location and/or a barcode of a sampling head to be used in sampling.

Figure 33:
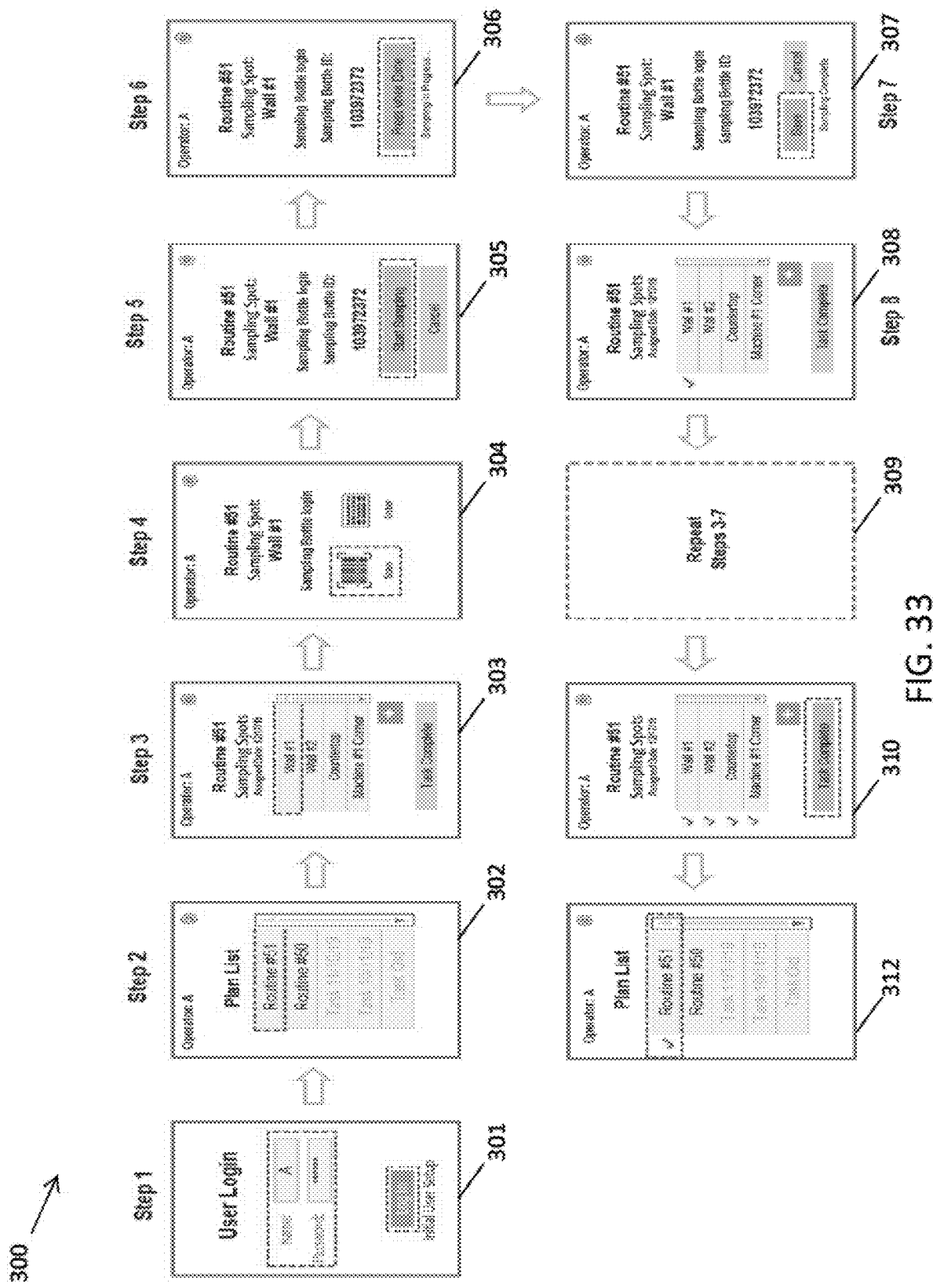
FIG. 33 shows exemplary operational views of a graphical user interface design of a powered sampling device illustrating sampling workflow in accordance with some embodiments.

FIG. 33 shows an exemplary general workflow 300 showing various views of a graphical user interface design of a powered sampling device in accordance with some embodiments. In step 1, screen view 301 shows the user login on the sampling device. In step 2, screen view 302 shows the sample plan listings displayed to the user. In step 3, screen view 303 shows the sampling routine details, such as the sampling spots to be sampled (e.g. wall, countertop, floor, equipment, etc.). In step 4, screen view 304 shows detailed instructions for a given sampling location and prompts the user to obtain the identification information for the sampling head. The user can select between scanning (e.g. barcode, or RFID) or from manual selection by which the user can manually enter the sample container identification number. In step 5, screen view 305 shows the sample container ID and prompts the user to start sampling. The user then samples with the powered sampling device, which can include any of the sampling features described herein (e.g. application of pressure and/or rotation of the sampling member attached to the sampling device). In step 6, screen view 306 shows that sampling is in progress and when completed, the user presses "Done". In step 7, screen view 307 prompts the user to save the sampling information associated with the sample that was just taken. In step 8, screen view 308 shows the current sampling routine and indicates which samples have been taken and which samples have yet to be taken. As indicated in frame 309, steps 3-7 are repeated for each sampling spot location in the routine until all sampling spots have been completed and saved. As shown in screen view 310, once the routine is completed, the user can press "Task Complete" which returns the workflow to screen view 312, which shows the task as complete within the overall sampling plan list. The steps in frames 302 through 312 can be repeated for each routine within the sampling plan list. While the above represents an exemplary sampling workflow, it is appreciated that various other screen views can be included or those shown can be modified as needed.

Figure 34:
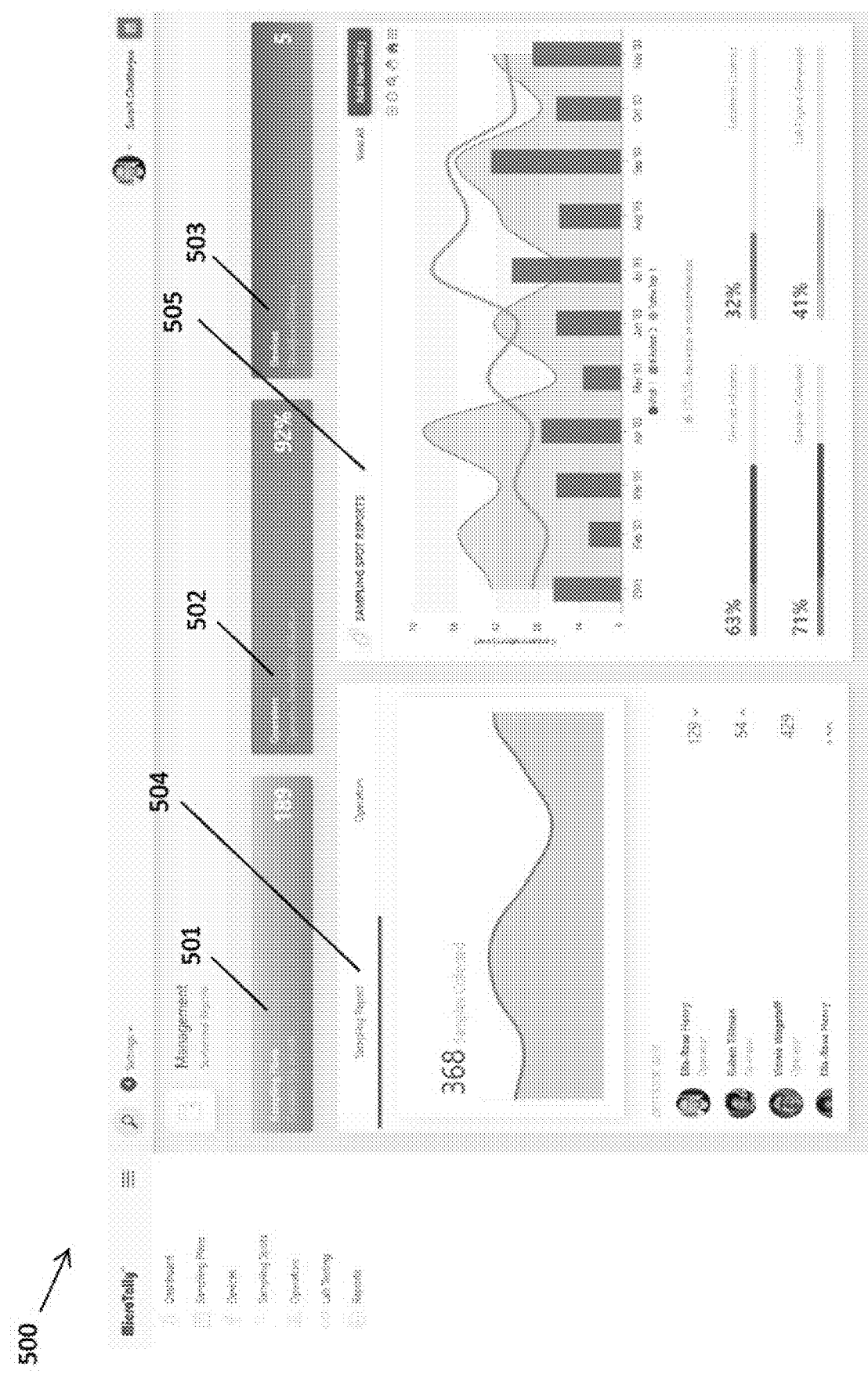
FIG. 34 shows a sampling result dashboard of a graphical user interface of an exemplary sampling management system in accordance with some embodiments.

FIG. 34 shows a management dashboard 500 of a graphical user interface for an exemplary sampling system in accordance with some embodiments. As shown, the dashboard 500 includes differing frames representing different aspects of the overall sampling system, for example, sampling plans 501, operators 502 and devices 503. Each of these can be selected to view and assess information relating to these different aspects. The dashboard further includes a sampling report section 504 and a sampling spot reports section 505 indicating sampling information and test result information from past samplings. In one aspect, by grouping sampling information by these different attributes, a system manager can view and recognize trends regarding each of these attributes, alone or in combination, that contribute to variations in sampling. In another aspect, this allows the manager to identify sampling needs or understand trends or changes in sampling locations.

Figure 35A:
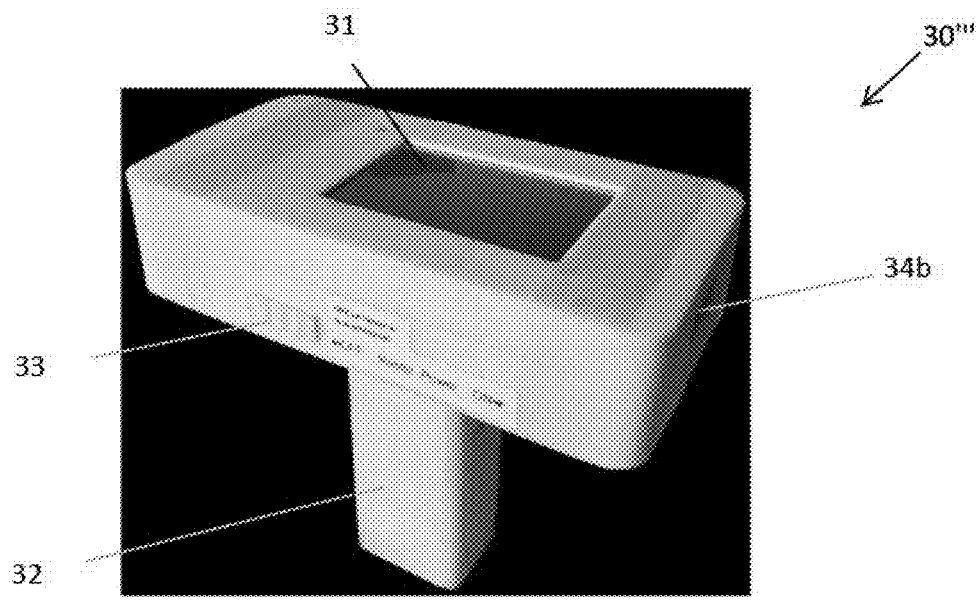
FIGS. 35A-35B shows another exemplary powered sampling device in accordance with some embodiments.
Figure 35B:
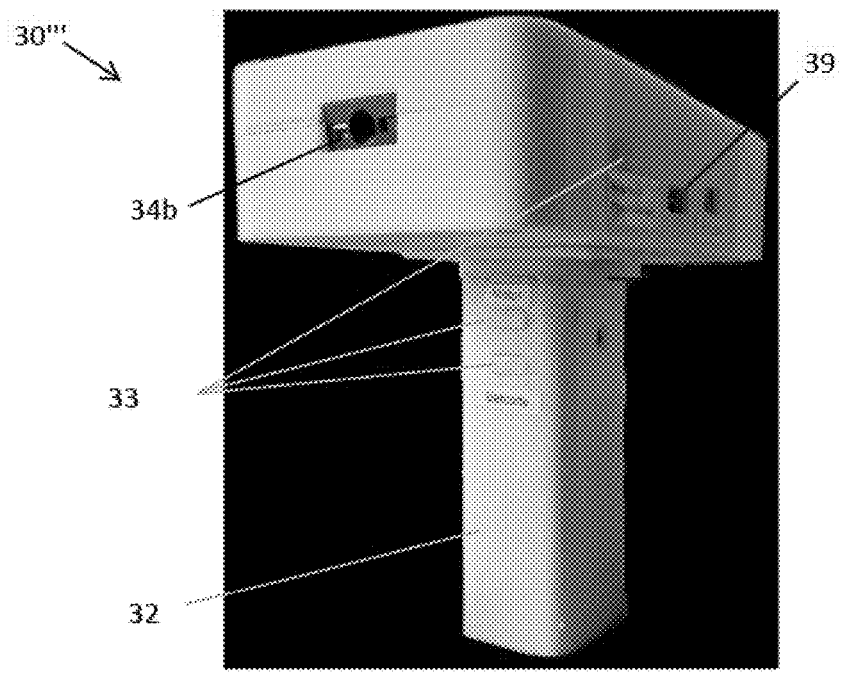

FIGS. 35A-35B shows an exemplary powered sampling device 30' in accordance with some embodiments. This design includes same, similar features (similarly referenced) as the previous design in FIG. 22 and FIGS. 29-31. As shown, this design includes an actuator connector 34b for connecting with a removable actuator rod, and reader 39 (e.g. imager, scanner) to be used as described in previous embodiments.

Figure 36A:
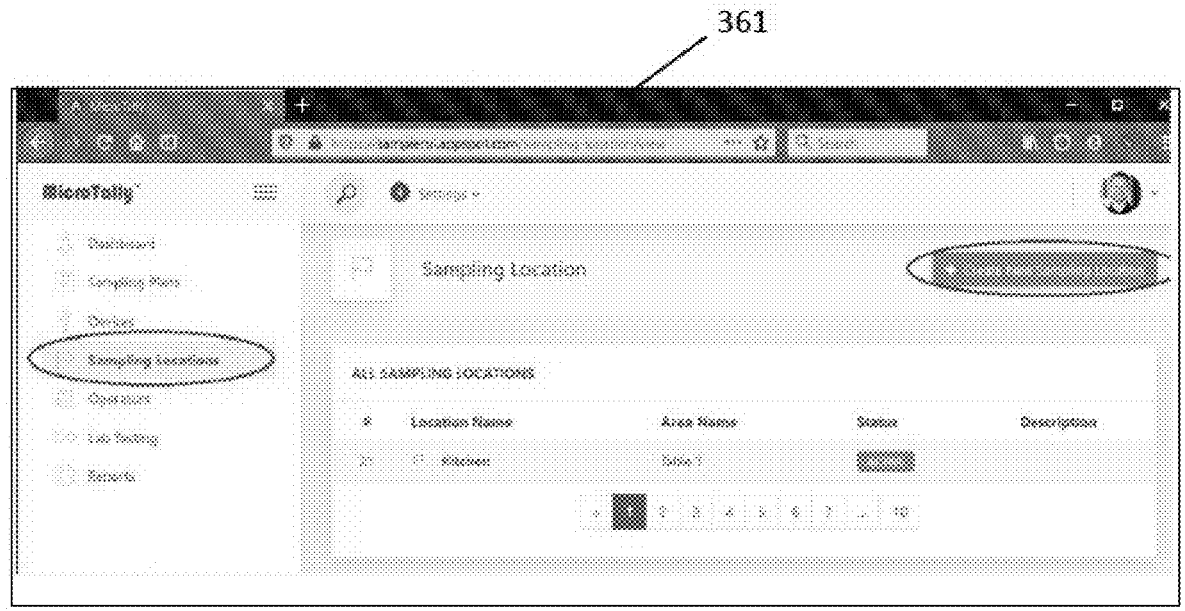
FIGS. 36A-36H shows setup screens of the graphical user interface of the sampling system to facilitate sampling management in accordance with some embodiments.
Figure 36B:
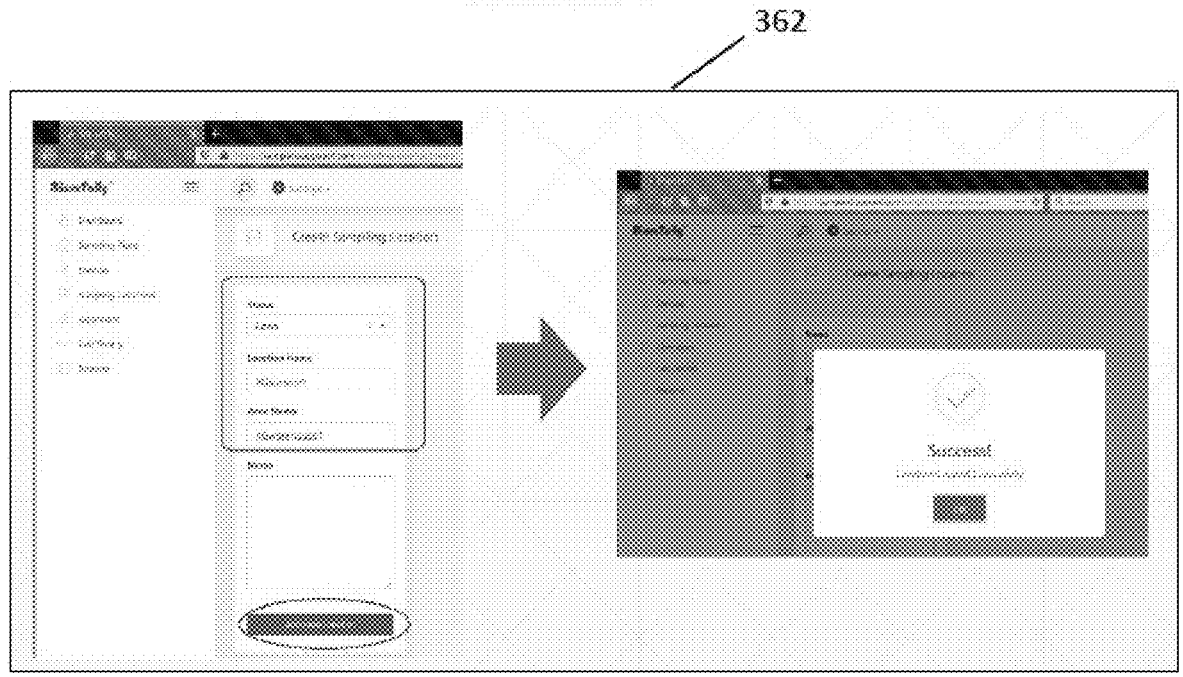
Figure 36C:
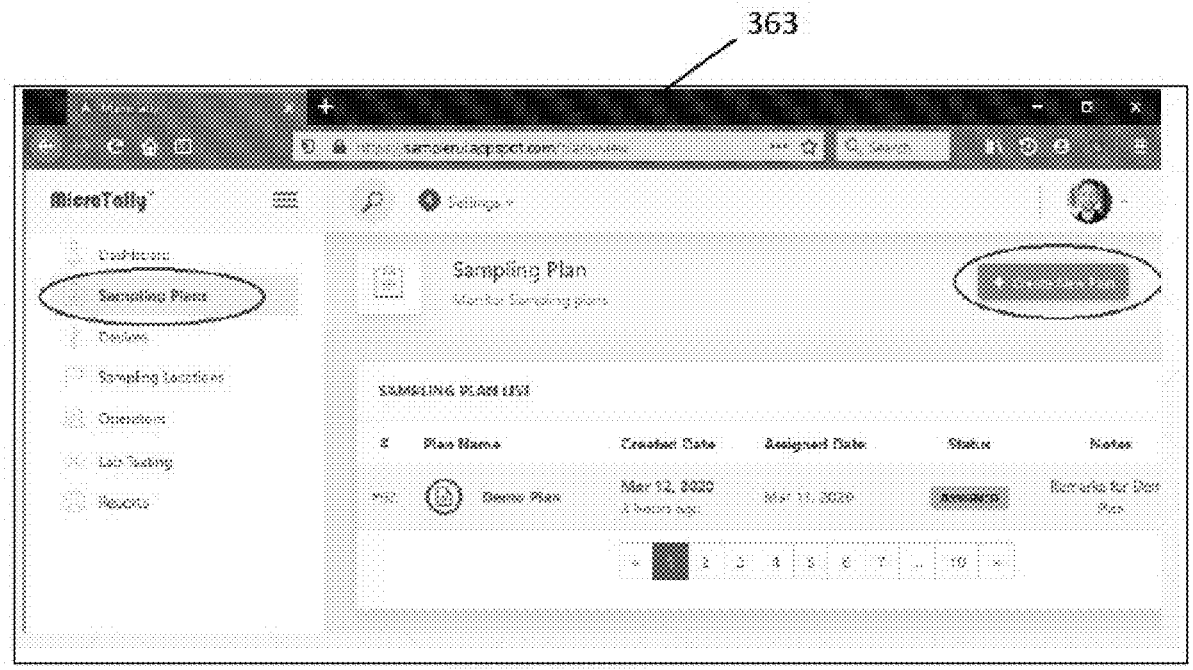
Figure 36D:
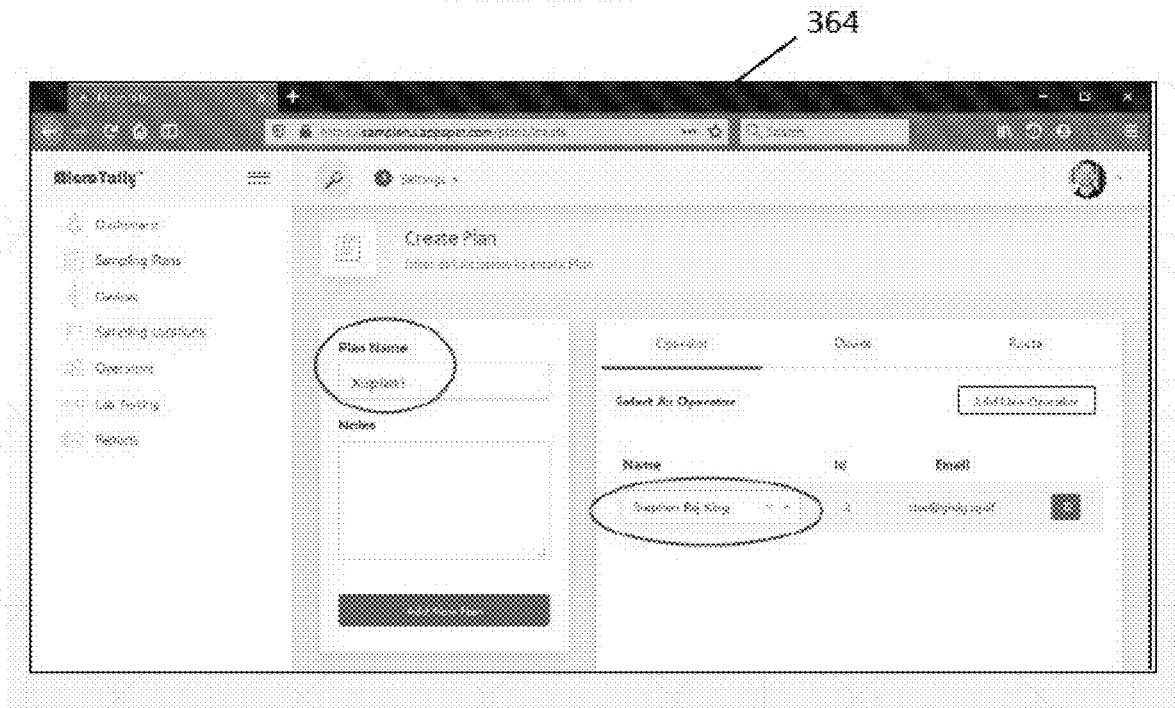
Figure 36E:
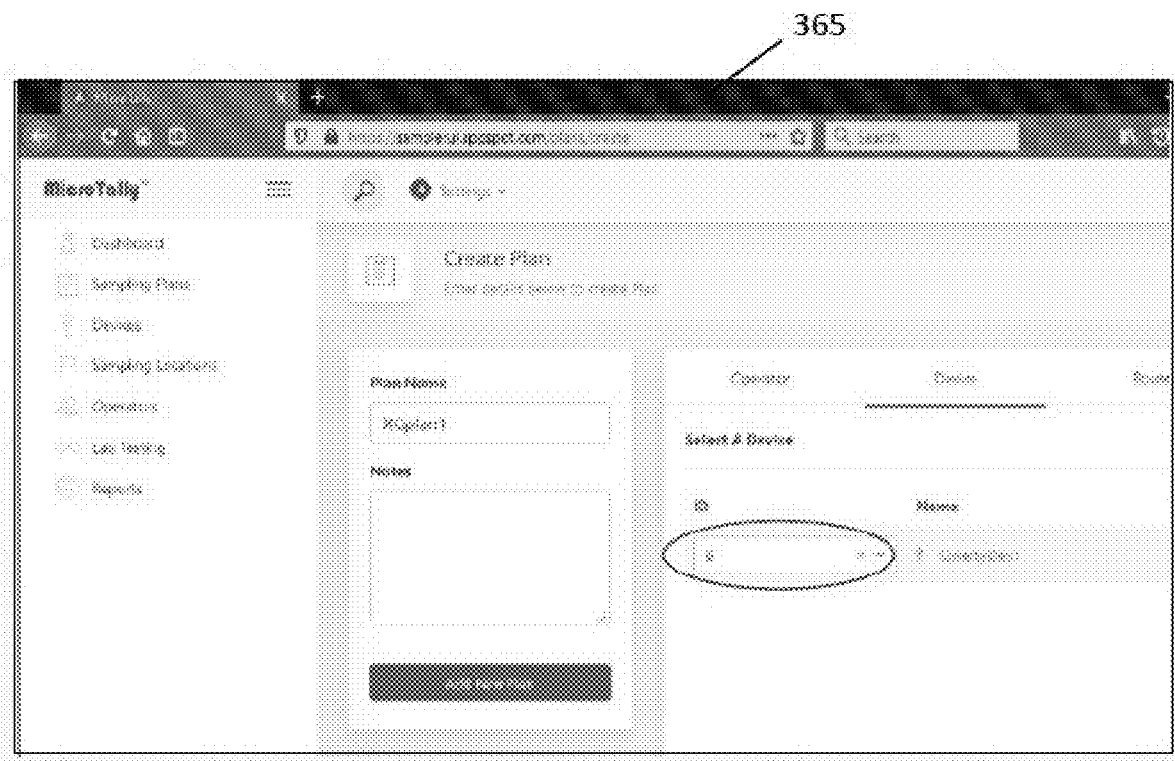
Figure 36F:
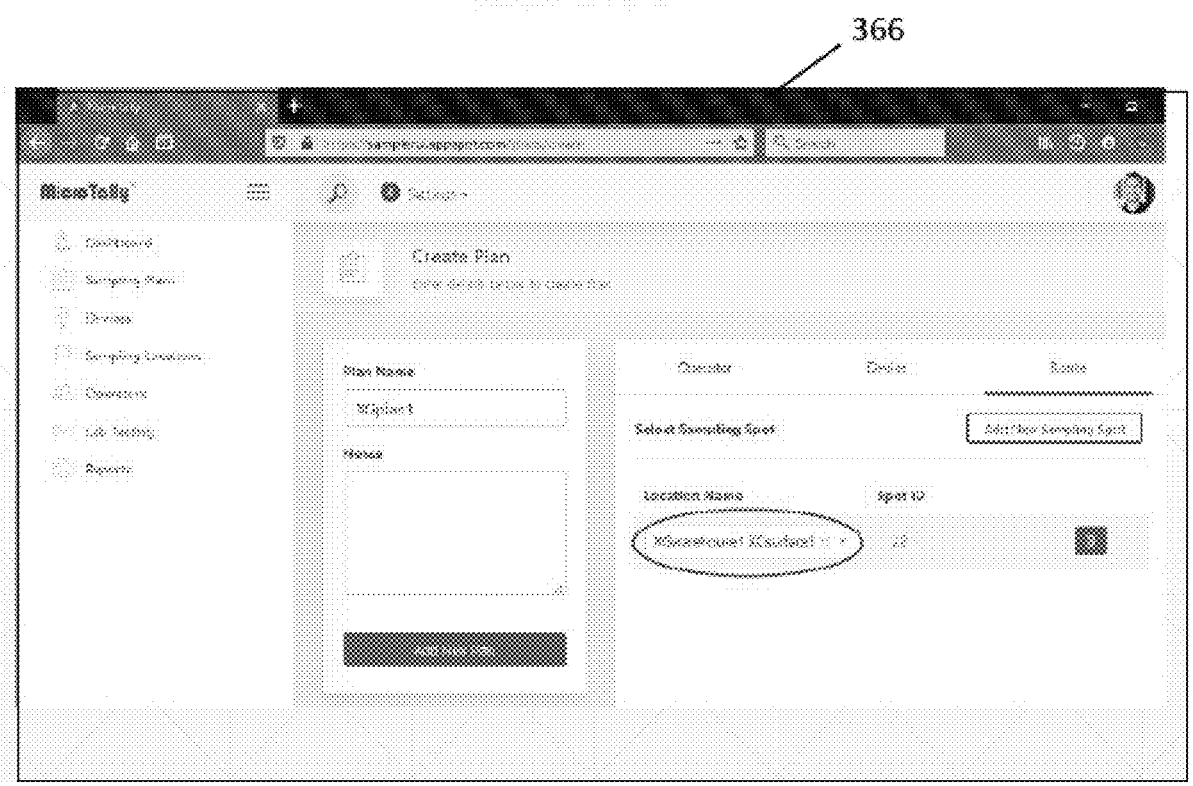
Figure 36G:
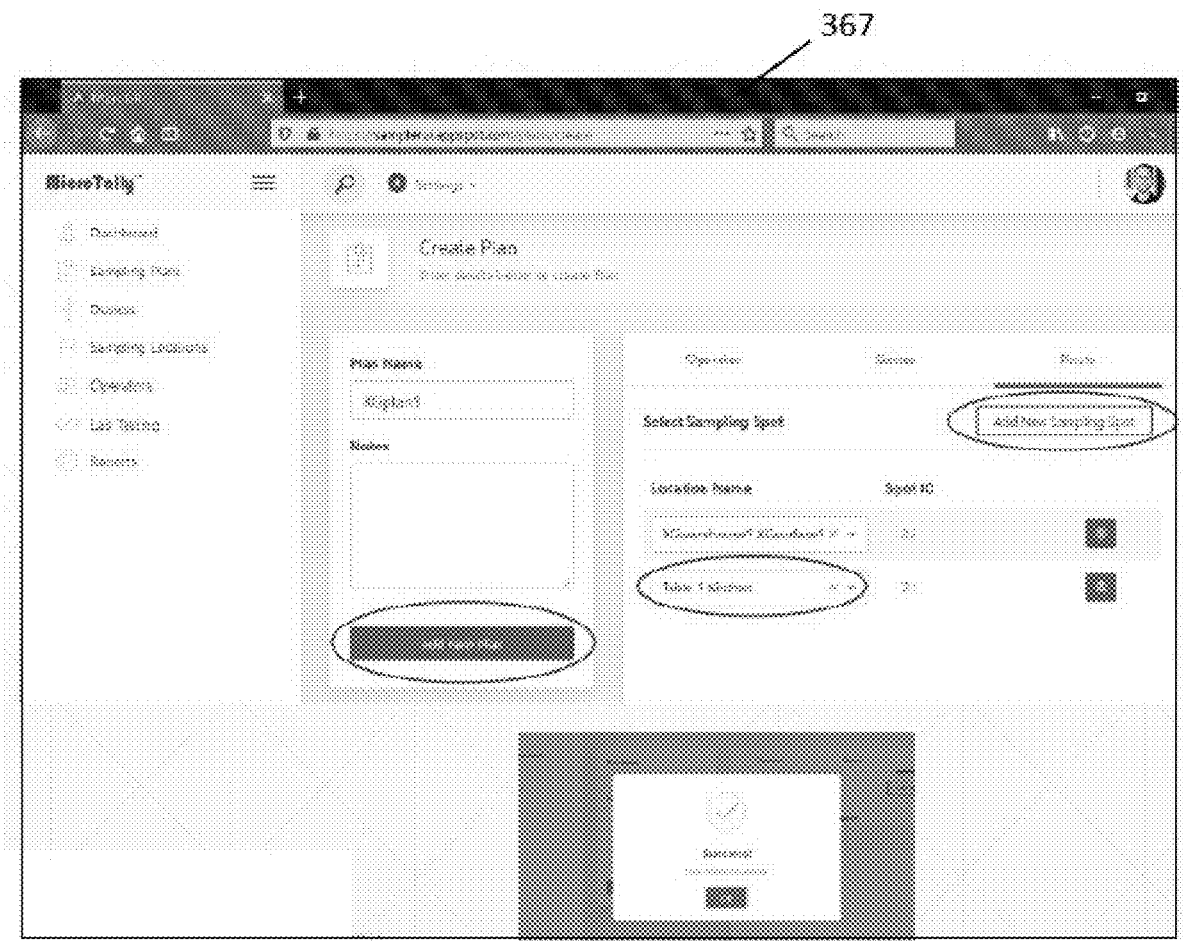
Figure 36H:
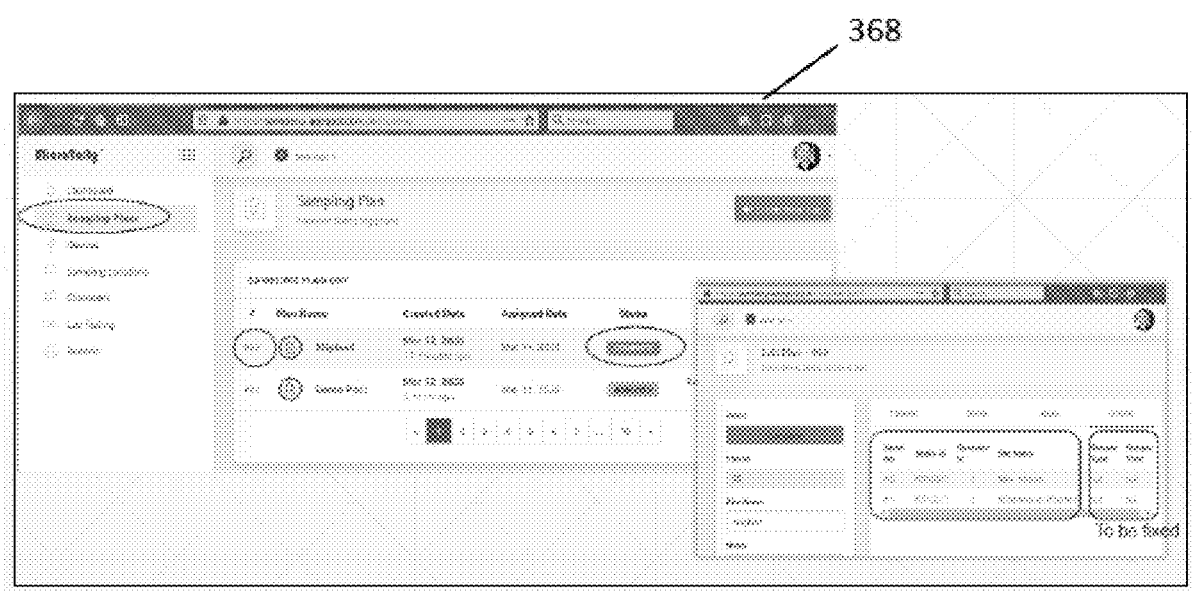

FIGS. 36A-36H shows setup screens for use in managing a sampling system to facilitate sampling in accordance with some embodiments. These screens can be included within a sampling setup plan wizard that guides the user through the process of setting up sampling plans and routines. The screens can be viewed in a graphical user interface of a computing device (e.g. smartphone, tablet, laptop, computer) communicatively coupled with the system, typically within the management unit. As shown in FIG. 36A, the sequence includes frame 3601 in which the user selects or creates new sampling locations. As shown in FIG. 36B, the sequence includes frame 362, in which the user can designate additional attributes for a given sampling location, such as status, location name and area name. As shown in FIG. 36C, the setup can include frame 363 in which the user can create, modify or view a sampling plan. As shown in FIG. 36D-36F, the setup can include frames 364, 365, 366 and 367 in which the user can enter, modify or view various attributes of a sampling plan. Once completed, the status of multiple sampling plans can be view or managed (e.g. assigned, completed), as shown in frame 368 of FIG. 36H. It is appreciated that the above frames of the setup are exemplary and that various other screens or modification of the above can be utilized as desired. These setup screens illustrate certain aspects that can be performed by a manager view through the management unit. Typically, these screens are included in an application framework on a computing device of the management unit and are included within programmable instructions recorded on a memory of the computing device.

In some embodiments, the sampling device includes wireless capabilities (e.g. RFID reading and scanning, Wi-Fi, Bluetooth data communication, near field communication). In some embodiments, the sampling device includes a scanner for QR scanning. In some embodiment, the sampling devices includes RFID reading/scanning/functionality, which can supplement or replace conventionally used QR scanning, by utilizing the RFID reader to detect an RFID chip secured at a particular sampling location. This can be used to ensure that samples are actually collected from the designated sampling locations (as compared to QR codes which can be readily duplicated and moved). In some embodiments, the sampling device can generate barcodes, which can be printed and scanned, either by the sampling device or by a separate component communicatively coupled thereto. This can be used to label sampling locations and/or to label the sampling container at each sampling location.

In yet another aspect, the sampling device can include additional features programmed either on the sampling device or on a separate component (e.g. smartphone, tablet, laptop) wirelessly coupled thereto. The additional features can be embodied in software recorded on a memory of a processing module. The additional software features can include, but are not limited to any of: user classifications (e.g., such as different roles: supervisor, manager, or operator); authorized user input to set up sample location, date and time, user name and test type; data logger functions and analyzer; data mapping to sample collection locations (e.g. mapping); timer for timed sampling interval setting; generating testing reports; alarm when the data sample goes beyond the user set threshold; warnings; data archiving/reading to trace back contaminated spots based on testing results; or any combination of these features.

It is appreciated that a sampling device or system in accordance with any of the concepts described herein can be used to facilitate any of the sampling approaches and methods described in PCT Application No. US2018/045699 filed Aug. 8, 2018 (included in Appendix). In some embodiments, the sampling device can be configured to perform one or more steps in a particular sampling protocol to improve sampling and standardization of sampling as described herein.

While the exemplary embodiments have been described in some detail, by way of example and for clarity of understanding, those of skill in the art will recognize that a variety of modification, adaptations, and changes may be employed. For example, while a fully portable handheld sampling device is described herein, it is appreciated that the sampling device could be incorporated in a cart based system (e.g. hardwired to a power source or computer cart). Hence, the scope of the present invention should be limited solely by the appending claims.

In the foregoing specification, the invention is described with reference to specific embodiments thereof, but those skilled in the art will recognize that the invention is not limited thereto. Various features, embodiments and aspects of the above-described invention can be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A sampling device for surface sampling, the sampling device comprising:
   a sampling head supporting and coupled with a sampling medium configured for surface sampling, wherein the sampling medium is attached to a distal portion of the sampling head;
   an actuator releasably coupled with the sampling head, wherein the actuator has a power source and is configured such that powered operation of the actuator imparts powered movement of the sampling head, thereby moving the sampling medium when attached to the sampling head during sampling; and
   a sample container releasably attached to the sampling head so as to contain the sampling medium therein while attached to the sampling head, wherein the sampling head includes a proximal coupling that sealingly interfaces with a top opening of the sample container to contain the sampling medium while attached to the sampling head.

2. The sampling device of claim 1, further comprising:
a handle for manually holding the sampling device during sampling, wherein the handle is a proximal portion of a housing in which the actuator is at least partly disposed.

3. The sampling device of claim 1, wherein the actuator comprises an oscillating mechanism that oscillates the sampling head back-and-forth so as to oscillate the sampling medium when coupled with the sampling head during sampling.

4. The sampling device of claim 1, wherein the actuator comprises a rotational mechanism that imparts rotational force to the sampling head so as to rotate the sampling medium when coupled with the sampling head during sampling.

5. The sampling device of claim 4, wherein the rotational mechanism includes a connector that interfaces with a shaft of the actuator and/or the sampling head.

6. The sampling device of claim 1, wherein the sampling medium is an absorbent material that absorbs a liquid residue of the surface upon contact.

7. The sampling device of claim 1, wherein the sampling head and the sampling medium have a generally circular shape in cross-section and the sampling container is at least partly cylindrical in shape.

8. The sampling device of claim 1, wherein the actuator comprises a rod that is removable from the sampling device.

9. The sampling device of claim 8, wherein the sampling device includes a housing, wherein the rod protrudes from the housing when in use during sampling and the rod is foldable so as to fold inward into the housing when not in use.

10. The sampling device of claim 8, wherein the rod has a distal sampling head support that is shaped to interface with a proximal end of the sampling head.

11. The sampling device of claim 10, wherein the distal sampling head support is substantially circular and the proximal end of the sampling head is a circular lid configured to sealingly engage with a sampling container.

12. The sampling device of claim 1, further comprising:
a reader and configured for imaging or scanning a barcode or QR code or for RFID detection to identify a sampling location and/or a sample container.

13. The sampling device of claim 1, wherein the power source comprises a battery.

14. The sampling device of claim 1, wherein the power source comprises stored mechanical energy from a spring.

15. The sampling device of claim 1, wherein the power source comprises a lever or trigger configured such that manual operation of the lever or trigger provides mechanical energy for powering operation of the actuator.

16. The sampling device of claim 1, wherein the sampling device is configured for food safety sampling.

17. The sampling device of claim 1, wherein the sampling medium comprises a planar piece of material attached to a distal end of a rod of the actuator.

* * * * *